(12) United States Patent
Zhou et al.

(10) Patent No.: US 12,484,036 B2
(45) Date of Patent: Nov. 25, 2025

(54) BANDWIDTH PART SWITCHING METHOD, APPARATUS, AND SYSTEM

(71) Applicant: Huawei Technologies Co., Ltd., Shenzhen (CN)

(72) Inventors: Jianwei Zhou, Hangzhou (CN); Yu Wang, Hangzhou (CN); Ying Chen, Hangzhou (CN); Hejia Luo, Hangzhou (CN); Chenlei Xu, Hangzhou (CN); Jun Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 413 days.

(21) Appl. No.: 18/301,521

(22) Filed: Apr. 17, 2023

(65) Prior Publication Data

US 2023/0262677 A1    Aug. 17, 2023

Related U.S. Application Data

(63) Continuation of application No. PCT/CN2021/119912, filed on Sep. 23, 2021.

(30) Foreign Application Priority Data

Oct. 15, 2020  (CN) ......................... 202011102999.2

(51) Int. Cl.
 *H04W 72/044* (2023.01)
 *H04W 48/08* (2009.01)
 *H04W 74/0833* (2024.01)
(52) U.S. Cl.
 CPC ......... *H04W 72/046* (2013.01); *H04W 48/08* (2013.01); *H04W 74/0833* (2013.01)

(58) Field of Classification Search
 None
 See application file for complete search history.

(56) References Cited

U.S. PATENT DOCUMENTS

2019/0313410 A1* 10/2019 Yang ................. H04W 72/0453
2021/0058947 A1*  2/2021 Lin ........................ H04W 72/04
(Continued)

FOREIGN PATENT DOCUMENTS

WO      2020173827 A1    9/2020
WO      2020204322 A1   10/2020

OTHER PUBLICATIONS

3GPP TR 38.821 V16.0.0, Dec. 2019, "3rd Generation Partnership Project; Technical Specification Group Radio Access Network; Solutions for NR to support non-terrestrial networks (NTN) (Release 16)," 140 pages.
(Continued)

*Primary Examiner* — Hong S Cho
(74) *Attorney, Agent, or Firm* — Conley Rose, P.C.

(57) ABSTRACT

A bandwidth part switching method, is applicable to a non-terrestrial network (NTN) to implement BWP switching based on multi-color frequency-division multiplexing. In the method, a terminal device may report, in a second BWP to a network device, an index of a first SSB whose signal quality is greater than or equal to a first threshold in one or more SSBs in a first BWP, and switch from the second BWP to a third BWP. The one or more SSBs correspond to at least one BWP other than the first BWP, and the third BWP is in the at least one BWP and corresponds to the first SSB. After receiving the index of the first SSB in the second BWP, the network device determines the third BWP, and performs service data transmission with the terminal device in the third BWP.

20 Claims, 11 Drawing Sheets

(56) References Cited

U.S. PATENT DOCUMENTS

2021/0120581 A1* 4/2021 Kim .................. H04W 74/0833
2021/0204231 A1* 7/2021 Harada ................. H04W 72/23

OTHER PUBLICATIONS

R1-2005576, Sony, "Discussion on beam management and BWP operation for NTN," 3GPP TSG RAN WG1 Meeting #102-e, Aug. 24-28, 2020, XP051917556, 13 pages.
R1-2005498, MediaTek Inc, "Other Aspects of NR-NTN," 3GPP TSG RAN WG1 Meeting #102e, Aug. 24-28, 2020, 13 pages.
R1-2007060, MediaTek Inc, "Summary of 8.4.4 Other Aspects of NR-NTN," 3GPP TSG RAN WG1 Meeting #102e, XP051921231, Aug. 17-28, 2020, 42 pages.
R1-2006807, Qualcomm Incorporated, "SSB arrangements, BWP operation and other issues for NTN," 3GPP TSG RAN WG1 #102-e, Aug. 17-28, 2020, 7 pages.
R1-2005966, ZTE, "Discussion on additional enhancement for NTN," 3GPP TSG RAN WG1 #102-e, XP052347340, e-Meeting, Aug. 17-28, 2020, 7 pages.

* cited by examiner

BANDWIDTH PART SWITCHING METHOD, APPARATUS, AND SYSTEM

CROSS-REFERENCE TO RELATED APPLICATIONS

This application is a continuation of International Patent Application No. PCT/CN2021/119912, filed on Sep. 23, 2021, which claims priority to Chinese Patent Application No. 202011102999.2, filed on Oct. 15, 2020. The disclosures of the aforementioned applications are hereby incorporated by reference in their entireties.

TECHNICAL FIELD

This application relates to the field of communication technologies, and in particular, to a bandwidth part switching method, an apparatus, and a system.

BACKGROUND

With development of communication requirements, a 5th generation (5G) network and a future network not only need to meet a plurality of service requirements, but also need to provide wider service coverage. A non-terrestrial network (NTN) is less affected by a geographical condition, can implement global coverage, and is an important development direction of future communication.

Currently, to reduce interference between beams, a main method proposed in an NTN proposal is beam division based on multi-color frequency division multiplexing. Based on the fact that a terminal device supports a maximum of four bandwidth parts (BWPs) in a new radio (NR) standard, currently beam division based on four-color frequency division multiplexing is mainly considered. To be specific, adjacent beams are divided into different BWPs, such that the beams correspond to different frequency bands, and beams that are far away from each other may be divided into a same frequency band to implement frequency division multiplexing. Each beam corresponds to one synchronization signal (SS)/physical broadcast channel (PBCH) block (SSB).

How to perform BWP management based on the foregoing multi-color frequency division multiplexing to implement BWP switching is an urgent problem to be resolved currently.

SUMMARY

This application provides a bandwidth part switching method, an apparatus, and a system, to implement BWP switching and reduce signaling overheads in a BWP switching process.

To achieve the foregoing objective, this application uses the following technical solutions.

According to a first aspect, a bandwidth part switching method is provided. The method may be applied to an NTN scenario, for example, a satellite communication system. The method may be performed by a terminal device, or may be performed by a component of the terminal device, for example, a processor, a chip, or a chip system of the terminal device. In this application, an example in which the method is performed by the terminal device is used for description. The method includes: The terminal device sends an index of a first synchronization signal/physical broadcast channel block SSB to a network device in a second BWP, and switches from the second BWP to a third BWP, where signal quality of the first SSB is greater than or equal to a first threshold, the first SSB is one of one or more SSBs in a first BWP, the one or more SSBs correspond to at least one BWP other than the first BWP, and the third BWP is a BWP that is in the at least one BWP and that corresponds to the first SSB.

According to this solution, in a multi-color frequency division multiplexing scenario, when the signal quality of the first SSB in the second BWP is greater than the first threshold, the terminal device switches from the second BWP to the third BWP corresponding to the first SSB, to complete BWP switching without using a signaling indication of the network device. This reduces signaling overheads and improves BWP switching efficiency. The terminal device sends the index of the first SSB to the network device, such that the network device can determine the third BWP. In this way, BWPs of the network device and the terminal device are synchronized, to facilitate service data transmission.

In some possible designs, the second BWP and/or the third BWP include/includes a first sub-BWP and one or more second sub-BWPs. The first sub-BWP is used for transmission of configuration information and/or system information corresponding to an SSB, and the second sub-BWP is used for service data transmission.

According to this solution, in this application, the second BWP and/or the third BWP are/is further divided. In one aspect, flexibility of BWP division is improved. In another aspect, based on the further division, a requirement on an operating bandwidth of the terminal device can be reduced, and adaptability of a BWP to the terminal device can be improved. For example, a maximum bandwidth of an NR system is 400 M. In four-color frequency division multiplexing, if the bandwidth is evenly allocated, bandwidths of a BWP 0 to a BWP 3 each are 100 M, and therefore the four-color frequency division multiplexing cannot operate for a terminal device that supports a maximum bandwidth of 20 M in a Long-Term Evolution (LTE) or NR standard. In this application, a second sub-BWP is obtained through division in a BWP, such that the second sub-BWP in the BWP can be used for communication even if the operating bandwidth of the terminal device is less than a bandwidth of the entire BWP.

In some possible designs, the bandwidth part switching method may further include: The terminal device receives first configuration information in the first sub-BWP of the third BWP, and performs the service data transmission in a first active BWP, where the first configuration information is used to configure the one or more second sub-BWPs of the third BWP, and the first active BWP is one of the one or more second sub-BWPs of the third BWP.

In some possible designs, the bandwidth part switching method may further include: The terminal device receives, in the first sub-BWP of the third BWP, system information corresponding to the first SSB, where the system information corresponding to the first SSB includes a configuration parameter of a beam corresponding to the first SSB.

In some possible designs, before the terminal device sends the index of the first SSB to the network device in the second BWP, the bandwidth part switching method further includes: The terminal device receives a second SSB in the first BWP, and initiates random access in the first sub-BWP of the second BWP and on a random access channel occasion corresponding to the second SSB, where a BWP corresponding to the second SSB is the second BWP.

According to this solution, initial access in the multi-color frequency division multiplexing scenario can be implemented.

In some possible designs, the bandwidth part switching method further includes: The terminal device receives, in the first sub-BWP of the second BWP, system information corresponding to the second SSB, where the system information corresponding to the second SSB includes a configuration parameter of a beam corresponding to the second SSB.

In some possible designs, the bandwidth part switching method further includes: The terminal device receives second configuration information in the first sub-BWP of the second BWP, where the second configuration information is used to configure the one or more second sub-BWPs of the second BWP; and the terminal device performs the service data transmission in a second active BWP, where the second active BWP is one of the one or more second sub-BWPs of the second BWP.

In some possible designs, the bandwidth part switching method further includes: The terminal device receives a first system information block SIB 1 in the first BWP, where the first SIB 1 indicates one or more of the following: a mapping relationship between the one or more SSBs and the at least one BWP, a time domain position and/or a frequency domain position of the first sub-BWP of the second BWP and/or a time domain position and/or a frequency domain position of the first sub-BWP of the third BWP, or a time domain position of system information corresponding to each of the one or more SSBs.

In some possible designs, before the terminal device sends the index of the first SSB to the network device in the second BWP, the bandwidth part switching method further includes: The terminal device receives a second SSB in the first BWP, and initiates random access in the first BWP and on a random access channel occasion corresponding to the second SSB, where a BWP corresponding to the second SSB is the second BWP.

In some possible designs, the bandwidth part switching method further includes: The terminal device receives a second SIB 1 in the first BWP, where the second SIB 1 includes system information corresponding to each of the one or more SSBs.

In some possible designs, the bandwidth part switching method further includes: The terminal device receives indication information from the network device in the first BWP, where the indication information is used to indicate a mapping relationship between the one or more SSBs and the at least one BWP.

In some possible designs, the bandwidth part switching method further includes: The terminal device receives third configuration information from the network device. The third configuration information is used to configure a frequency for inter-frequency measurement and/or a measurement gap for the inter-frequency measurement, and the frequency for the inter-frequency measurement is a center frequency of the first BWP.

According to this solution, the frequency for the inter-frequency measurement is the center frequency of the first BWP, the measurement gap is an inter-frequency measurement gap corresponding to the first BWP, and SSBs corresponding to different BWPs are all located in the first BWP. Therefore, when measuring signal quality based on the third configuration information, the terminal device switches to the first BWP to measure signal quality of the SSBs corresponding to different BWPs in the first BWP, and does not need to switch to each BWP to measure signal quality of a channel state information reference signal (CSI-RS) in the BWP, such that a relatively small quantity of inter-frequency measurement frequencies and measurement gaps may be configured. This reduces signaling overheads and measurement complexity of the terminal device.

In some possible designs, the bandwidth part switching method further includes: When signal quality of a CSI-RS corresponding to the terminal device in the second BWP is less than or equal to a second threshold, the terminal device measures signal quality of the one or more SSBs in the first BWP.

According to this solution, when a serving BWP of the terminal device is the second BWP, BWP switching does not need to be performed when the signal quality of the CSI-RS corresponding to the terminal device in the second BWP is obtained. In this case, it is determined, based on the signal quality of the CSI-RS, whether to start to measure the signal quality of the one or more SSBs in the first BWP. This can reduce implementation complexity of the terminal device.

In some possible designs, that the terminal device switches from the second BWP to a third BWP includes: The terminal device switches from the second BWP to the third BWP in an $N^{th}$ time unit after a first time unit, where the first time unit is a time unit occupied when the terminal device sends the index of the first SSB to the network device.

According to a second aspect, a bandwidth part switching method is provided. The method may be applied to an NTN scenario, for example, a satellite communication system. The method may be performed by a network device, or may be performed by a component of the network device, for example, a processor, a chip, or a chip system of the network device. In this application, an example in which the method is performed by the network device is used for description. The method includes: The network device receives an index of a first synchronization signal/physical broadcast channel block SSB from a terminal device in a second bandwidth part BWP, where signal quality of the first SSB is greater than or equal to a first threshold, the first SSB is one of one or more SSBs in a first BWP, and the one or more SSBs correspond to at least one BWP other than the first BWP; and the network device determines a third BWP, and performs service data transmission in the third BWP, where the third BWP is a BWP that is in the at least one BWP and that corresponds to the first SSB. For technical effects brought by the second aspect, refer to the technical effects brought by the first aspect. Details are not described herein again.

In some possible designs, the second BWP and/or the third BWP include/includes a first sub-BWP and one or more second sub-BWPs. The first sub-BWP is used for transmission of configuration information and/or system information corresponding to an SSB, and the second sub-BWP is used for service data transmission.

In some possible designs, that the network device performs service data transmission in the third BWP includes: The network device performs the service data transmission in a first active BWP, where the first active BWP is one of the one or more second sub-BWPs of the third BWP. The bandwidth part switching method further includes: The network device sends first configuration information in the first sub-BWP of the third BWP, where the first configuration information is used to configure the one or more second sub-BWPs of the third BWP.

In some possible designs, the bandwidth part switching method further includes: The network device sends, in the first sub-BWP of the third BWP, system information corresponding to the first SSB, where the system information corresponding to the first SSB includes a configuration parameter of a beam corresponding to the first SSB.

In some possible designs, before the network device receives the index of the first SSB from the terminal device in the second BWP, the bandwidth part switching method further includes: The network device sends a second SSB in the first BWP, and detects, in the first sub-BWP of the second BWP and on a random access channel occasion corresponding to the second SSB, random access initiated by the terminal device, where a BWP corresponding to the second SSB is the second BWP.

In some possible designs, the bandwidth part switching method further includes: The network device sends, in the first sub-BWP of the second BWP, system information corresponding to the second SSB, where the system information corresponding to the second SSB includes a configuration parameter of a beam corresponding to the second SSB.

In some possible designs, the bandwidth part switching method further includes: The network device sends second configuration information in the first sub-BWP of the second BWP, where the second configuration information is used to configure the one or more second sub-BWPs of the second BWP; and the network device performs service data transmission in a second active BWP, where the second active BWP is one of the one or more second sub-BWPs of the second BWP.

In some possible designs, the bandwidth part switching method further includes: The network device sends a first system information block SIB 1 in the first BWP, where the first SIB 1 indicates one or more of the following: a mapping relationship between the one or more SSBs and the at least one BWP, a time domain position and/or a frequency domain position of the first sub-BWP of the second BWP and/or a time domain position and/or a frequency domain position of the first sub-BWP of the third BWP, or a time domain position of system information corresponding to each of the one or more SSBs.

In some possible designs, before the network device receives the index of the first SSB from the terminal device in the second BWP, the bandwidth part switching method further includes: The network device sends a second SSB in the first BWP, and detects, in the first BWP and on a random access channel occasion corresponding to the second SSB, random access initiated by the terminal device, where a BWP corresponding to the second SSB is the second BWP.

In some possible designs, the bandwidth part switching method further includes: The network device sends a second SIB 1 in the first BWP, where the second SIB 1 includes system information corresponding to each of the one or more SSBs.

In some possible designs, the bandwidth part switching method further includes: The network device sends indication information to the terminal device in the first BWP, where the indication information is used to indicate a mapping relationship between the one or more SSBs and the at least one BWP.

In some possible designs, the bandwidth part switching method further includes: The network device sends third configuration information to the terminal device. The third configuration information is used to configure a frequency for inter-frequency measurement and/or a measurement gap for the inter-frequency measurement, and the frequency for the inter-frequency measurement is a center frequency of the first BWP.

For technical effects brought by any possible design of the second aspect, refer to the technical effects brought by corresponding designs of the first aspect. Details are not described herein again.

According to a third aspect, a communication apparatus is provided, to implement the foregoing methods. The communication apparatus may be the terminal device in the first aspect, an apparatus including the terminal device, or an apparatus included in the terminal device, for example, a chip. Alternatively, the communication apparatus may be the network device in the second aspect, an apparatus including the network device, or an apparatus included in the network device. The communication apparatus includes a corresponding module, unit, or means for implementing the foregoing method. The module, unit, or means may be implemented by hardware, software, or hardware executing corresponding software. The hardware or the software includes one or more modules or units corresponding to the foregoing functions.

According to a fourth aspect, a communication apparatus is provided. The communication apparatus includes a processor and a memory. The memory is configured to store computer instructions. When the processor executes the instructions, the communication apparatus is enabled to perform the method according to either of the foregoing aspects. The communication apparatus may be the terminal device in the first aspect, an apparatus including the terminal device, or an apparatus included in the terminal device, for example, a chip. Alternatively, the communication apparatus may be the network device in the second aspect, an apparatus including the network device, or an apparatus included in the network device.

According to a fifth aspect, a communication apparatus is provided. The communication apparatus includes an interface circuit and a logic circuit. The interface circuit may be a code/data read/write interface circuit, and the interface circuit is configured to obtain input information and/or generate output information. The logic circuit is configured to perform the method according to either of the foregoing aspects, and perform processing and/or generate the output data based on the input information. The communication apparatus may be the terminal device in the first aspect, an apparatus including the terminal device, or an apparatus included in the terminal device, for example, a chip. Alternatively, the communication apparatus may be the network device in the second aspect, an apparatus including the network device, or an apparatus included in the network device.

According to a sixth aspect, a communication apparatus is provided. The communication apparatus includes at least one processor. The processor is configured to execute a computer program or instructions stored in a memory, such that the communication apparatus performs the method according to either of the foregoing aspects. The memory may be coupled to the processor, or may be independent of the processor. The communication apparatus may be the terminal device in the first aspect, an apparatus including the terminal device, or an apparatus included in the terminal device, for example, a chip. Alternatively, the communication apparatus may be the network device in the second aspect, an apparatus including the network device, or an apparatus included in the network device.

According to a seventh aspect, a computer-readable storage medium is provided. The computer-readable storage medium stores instructions. When the instructions are run on a communication apparatus, the communication apparatus is enabled to perform the method according to either of the foregoing aspects. The communication apparatus may be the terminal device in the first aspect, an apparatus including the terminal device, or an apparatus included in the terminal device, for example, a chip. Alternatively, the communication apparatus may be the network device in the second aspect, an apparatus including the network device, or an apparatus included in the network device.

According to an eighth aspect, a computer program product including instructions is provided. When the computer program product runs on a communication apparatus, the communication apparatus is enabled to perform the method according to either of the foregoing aspects. The communication apparatus may be the terminal device in the first aspect, an apparatus including the terminal device, or an apparatus included in the terminal device, for example, a chip. Alternatively, the communication apparatus may be the network device in the second aspect, an apparatus including the network device, or an apparatus included in the network device.

According to a ninth aspect, a communication apparatus is provided (for example, the communication apparatus may be a chip or a chip system). The communication apparatus includes a processor, configured to implement a function according to either of the foregoing aspects. In a possible design, the communication apparatus further includes a memory, where the memory is configured to store necessary program instructions and necessary data. When the communication apparatus is a chip system, the communication apparatus may include a chip, or may include a chip and another discrete component.

For technical effects brought by any one of the designs of the third aspect to the ninth aspect, refer to the technical effects brought by different designs of the first aspect or the second aspect. Details are not described herein again.

According to a tenth aspect, a communication system is provided. The communication system includes the terminal device in the foregoing aspects and the network device in the foregoing aspects.

DESCRIPTION OF EMBODIMENTS

Figure 1A:
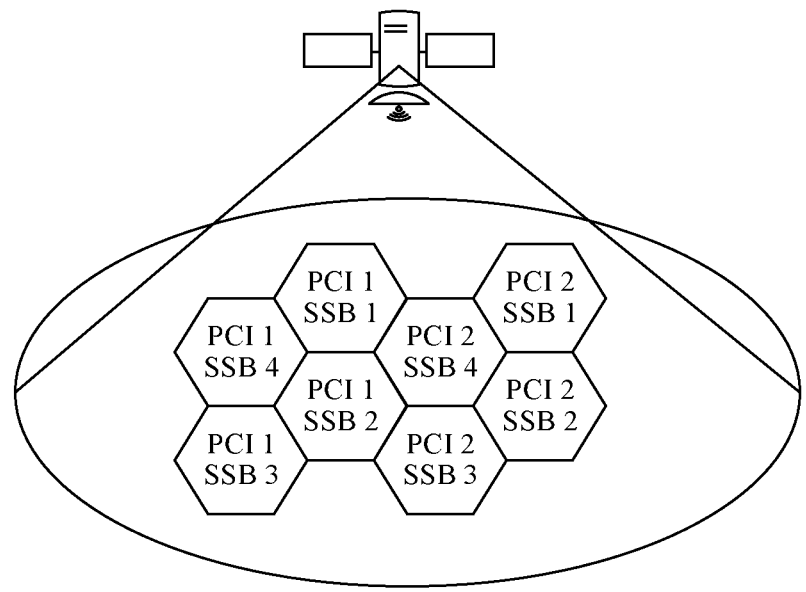
FIG. 1A is a schematic diagram of a mapping relationship between a PCI, an SSB, and a beam according to an embodiment of this application.

To facilitate understanding of technical solutions in embodiments of this application, a related technology in this application is first briefly described as follows.

1. Non-Terrestrial Network (NTN):

An NTN communication system may include a satellite communication system, and may mean that a base station or some base station functions are deployed on a satellite to provide coverage for a terminal device. Satellite communication has prominent advantages such as global coverage, long-distance transmission, flexible networking, convenient deployment, and freedom from a geographical condition, and has been widely applied to a plurality of fields such as maritime communication, positioning and navigation, disaster relief, scientific experiments, video broadcasting, and earth observation.

Based on a satellite altitude, namely, a satellite orbit altitude, a satellite system may be classified into a highly elliptical orbit (HEO) satellite, a geostationary earth orbit (GEO) satellite, a medium earth orbit (MEO) satellite, and a low-earth orbit (LEO) satellite. The GEO satellite is also referred to as a stationary satellite, and a moving speed of the GEO satellite is the same as a rotation speed of the earth. Therefore, the GEO satellite remains stationary relative to the ground. Accordingly, a cell of the GEO satellite is also stationary. Coverage of the cell of the GEO satellite is large, and a diameter of the cell is usually 500 kilometers (km). The LEO satellite moves fast relative to the ground at a speed of about 7 km per second. Therefore, service coverage provided by the LEO satellite also moves. Usually, a higher orbit of a satellite indicates larger coverage of the satellite but a longer communication delay of the satellite.

If satellite systems are classified based on an on-satellite processing capability, the satellite communication systems may be classified into a transparent satellite system and a regenerative satellite system. A transparent satellite transparently transmits only a signal and shifts a spectrum, and does not process information. A regenerative satellite has an on-satellite signal processing capability. The satellite can extract an original baseband signal and use information to perform routing, switching, and system configuration. At present, the transparent satellite system and the regenerative satellite system coexist and are developed together.

If satellite systems are classified based on whether a satellite beam moves with a satellite, the satellite communication systems may be classified into a non-gaze satellite system and a gaze satellite system. A satellite beam of the non-gaze satellite system moves with a satellite. Each beam angle of the satellite does not change with time from a perspective of the satellite. Relatively frequent beam switching occurs at a fixed terrestrial point when the satellite flies over the point. A beam angle of a satellite in the gaze satellite system is adjusted in a specified manner. Continuous observation can be implemented for the fixed terrestrial point using the satellite through switching of the beam angle.

In addition, the NTN communication system may further include a high altitude platform station (HAPS) communication system, and means that a base station or some base station functions is/are deployed on a high altitude platform station to provide coverage for a terminal device.

2. Beam:

The beam is a communication resource. The beam may be a wide beam, a narrow beam, or a beam of another type. A technology for forming the beam may be a beamforming technology or another technical means. The beamforming technology may be a digital beamforming technology, an analog beamforming technology, or a hybrid digital/analog beamforming technology. Different beams may be considered as different resources. Same information or different information may be sent using different beams.

3. Mapping Relationship Between a Physical Cell Identifier, an SSB, and a Beam:

In the 38.821 protocol, there are two mapping relationships between a physical cell identifier (PCI), an SSB, and a beam: an option a and an option b.

The option a: A same PCI has different SSBs, each SSB corresponds to one beam, and different SSBs correspond to different beams. In other words, one PCI corresponds to one or more SSBs, and each SSB corresponds to one beam. In other words, there are a plurality of beams in one cell, and each beam has an independent SSB index.

For example, in the option a, as shown in FIG. 1A, each hexagon represents one beam, a PCI in the hexagon represents a PCI corresponding to the beam, and an SSB index represents an SSB corresponding to the beam. In this case, FIG. 1A includes two cells: a PCI 1 and a PCI 2. Each of the two cells includes four beams, and different beams correspond to different SSBs.

The option b: Each beam serves as one cell, different beams correspond to different PCIs, and the different beams correspond to different SSBs.

Figure 1B:
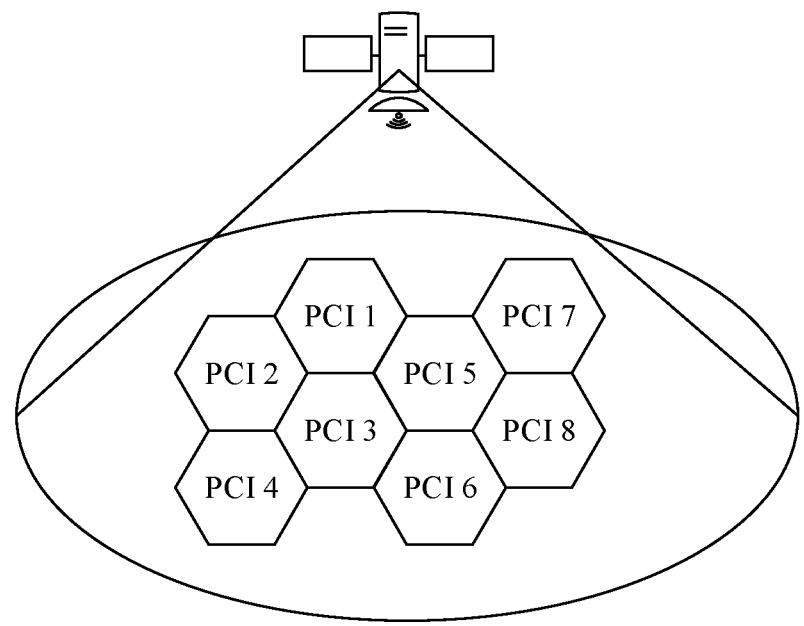
FIG. 1B is a schematic diagram of another mapping relationship between a PCI and a beam according to an embodiment of this application.

For example, in the option b, as shown in FIG. 1B, each hexagon represents one beam, and each beam serves as one cell, in other words, one cell corresponds to one beam. In this case, FIG. 1B includes eight cells, and each cell corresponds to one beam.

4. BWP:

The BWP may also be referred to as a carrier bandwidth part. In frequency domain, one BWP includes a positive integer quantity of consecutive resource elements, for example, includes a positive integer quantity of consecutive subcarriers, resource blocks (RBs), or resource block groups (RBGs). The BWP may be a downlink BWP or an uplink BWP. The uplink BWP is used by a terminal to send a signal to a network device, and the downlink BWP is used by a network device to send a signal to a terminal. In this embodiment of this application, the positive integer quantity of resource elements may be one, two, three, or more. This is not limited in this embodiment of this application.

A plurality of BWPs may be configured for the terminal. For each BWP, a numerology of the BWP may be independently configured through pre-configuration or by sending signaling by the network device to the terminal. Numerologies of different BWPs may be the same or different. The numerology may be defined based on but not limited to one or more of the following parameter information: a subcarrier spacing, a cyclic prefix (CP), information about a time unit, BWP bandwidth, and the like. For example, the numerology may be defined using the subcarrier spacing and the CP.

5. Four-Color Frequency Division Multiplexing:

For example, four BWPs supported by the terminal are a BWP 0, a BWP 1, a BWP 2, and a BWP 3, and center frequencies of the four BWPs are F0, F1, F2, and F3 respectively. The BWP 0 serves as a synchronization frequency band of the BWP 1 to the BWP 3, and the BWP 1 to the BWP 3 are mainly used for service communication. That is, one or more SSBs are sent in the BWP 0 in a time division manner. Each SSB corresponds to one beam other than the BWP 0. The beam corresponds to one of the BWP 1 to the BWP 3, and different beams may correspond to a same BWP. In other words, one SSB sent in the BWP 0 corresponds to one BWP other than the BWP 0, and different SSBs in the BWP 0 may correspond to a same BWP.

Figure 2:
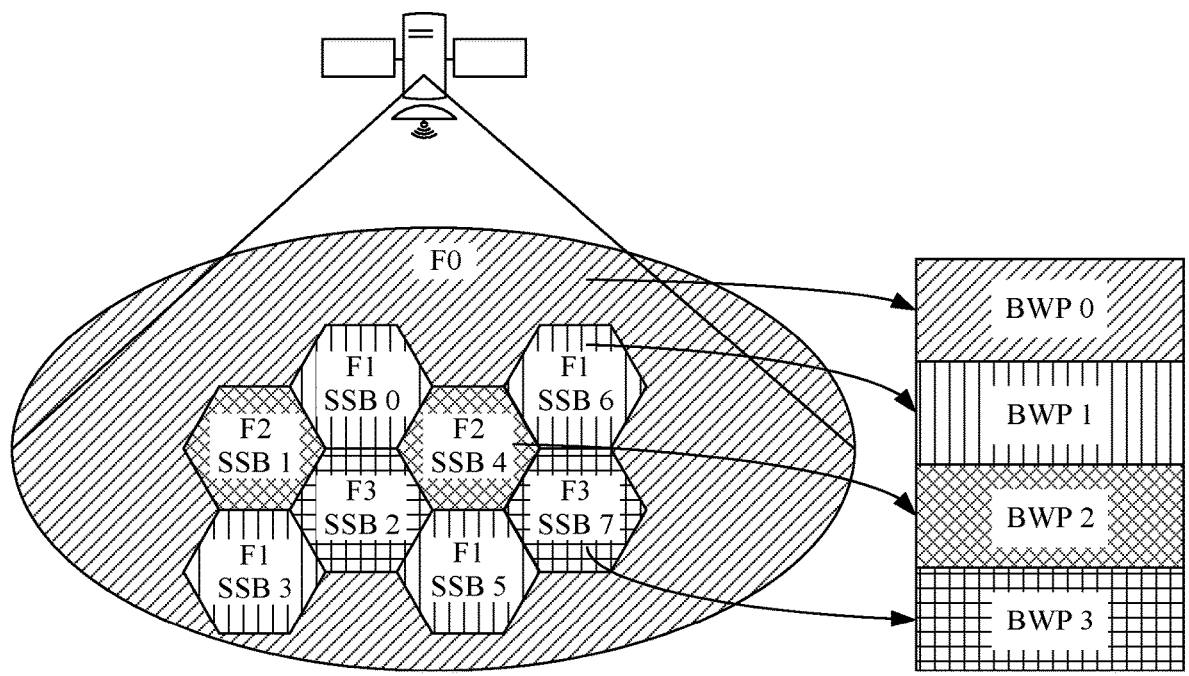
FIG. 2 is a schematic diagram of four-color frequency division multiplexing according to an embodiment of this application.

For example, as shown in FIG. 2, an SSB 0, an SSB 3, an SSB 5, and an SSB 6 respectively correspond to four beams in the BWP 1. In other words, the SSB 0, the SSB 3, the SSB 5, and the SSB 6 correspond to the BWP 1. An SSB 1 and an SSB 4 respectively correspond to two beams in the BWP 2. In other words, the SSB 1 and the SSB 4 correspond to the BWP 2. An SSB 2 and an SSB 7 respectively correspond to two beams in the BWP 3. In other words, the SSB 2 and the SSB 7 correspond to the BWP 3.

The following describes the technical solutions in embodiments of this application with reference to the accompanying drawings in embodiments of this application. In the descriptions of this application, unless otherwise specified, "I" indicates an "or" relationship between associated objects. For example, AB may indicate A or B. In this application, "and/or" describes only an association relationship between associated objects and indicates that three relationships may exist. For example, A and/or B may indicate the following three cases: Only A exists, both A and B exist, and only B exists, where A and B may be singular or plural. In addition, in the descriptions of this application, unless otherwise specified, "at least one" means one or more, and "a plurality of" means two or more. "At least one of the following items (pieces)" or a similar expression thereof means any combination of these items, including any combination of singular items (pieces) or plural items (pieces). For example, at least one item (piece) of a, b, or c may indicate a, b, c, a-b, a-c, b-c, or a-b-c, where "-" indicates that associated objects are in an "and" relationship, and a, b, and c may be singular or plural.

In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

The technical solutions in embodiments of this application may be applied to various communication systems, for example, orthogonal frequency-division multiple access (OFDMA), single-carrier frequency-division multiple access (SC-FDMA), a satellite communication system, an NTN system, an Internet of things (IoT) system, or a future evolved communication system. Terms "system" and "network" may be interchanged with each other. In addition, the communication systems may be further applied to a futureoriented communication technology, and are all applicable to the technical solutions provided in embodiments of this application.

The foregoing communication systems applicable to this application are merely examples for description, and are not limited thereto. Unified descriptions are provided herein and details are not described below again.

Figure 3:
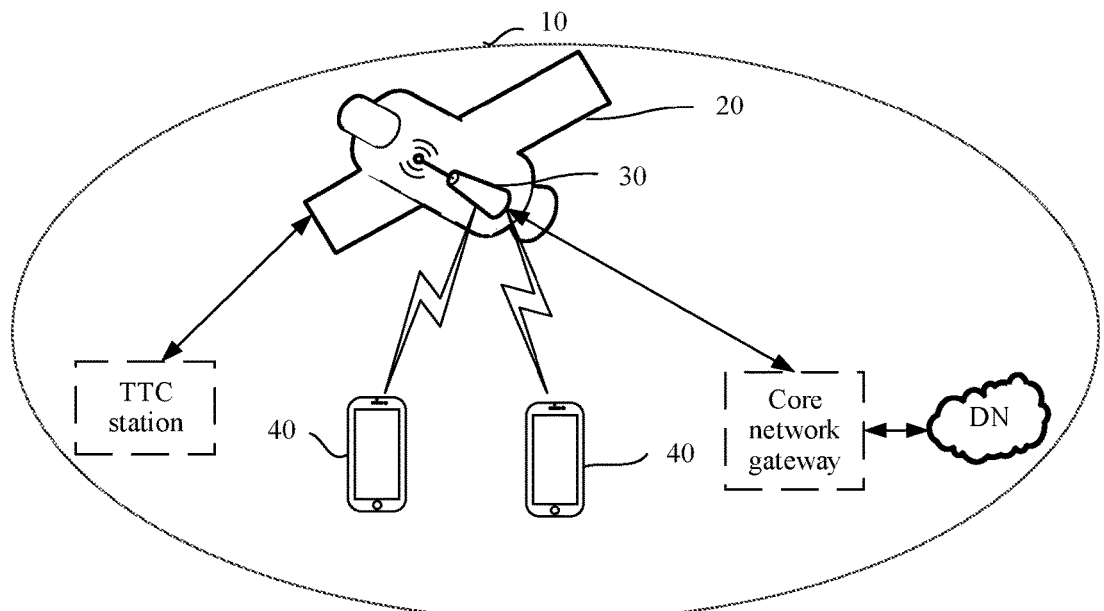
FIG. 3 is a schematic diagram of a structure of a communication system according to an embodiment of this application.

FIG. 3 shows a communication system 10 according to this application. The communication system 10 includes a network device 30 and one or more terminal devices 40 connected to the network device 30. Optionally, different terminal devices 40 may communicate with each other.

For example, as shown in FIG. 3, the network device 30 communicates with any terminal device 40. In this application, the terminal device sends an index of a first SSB to the network device in a second BWP, and switches from the second BWP to a third BWP. Signal quality of the first SSB is greater than or equal to a first threshold, the first SSB is one of one or more SSBs in a first BWP, the one or more SSBs correspond to at least one BWP other than the first BWP, and the third BWP is a BWP that is in the at least one BWP and that corresponds to the first SSB. Correspondingly, after receiving the index of the first SSB from the terminal device in the second BWP, the network device determines the third BWP, and performs service data transmission in the third BWP.

According to this solution, when signal quality of the first SSB in the second BWP is greater than the first threshold, the terminal device switches from the second BWP to the third BWP corresponding to the first SSB, to complete BWP switching without using a signaling indication of the network device. This reduces signaling overheads and improves BWP switching efficiency. The terminal device sends the index of the first SSB to the network device, such that the network device can determine the third BWP. Therefore, BWPs of the network device and the terminal device are synchronized, to facilitate service data transmission.

Optionally, the network device 30 in this embodiment of this application may be deployed on a high altitude platform station or a satellite 20. Optionally, the communication system 10 may further include a telemetry, tracking, and command (TTC) station and a core network gateway. The network device 30 may be connected to the core network gateway, and exchange data with a terrestrial data network (DN) through the core network gateway. The TTC station is configured to complete measurement, telemetering, and the like for the high altitude platform station or the satellite 20, for example, control a flight attitude of the high altitude platform station or the satellite 20, and control a switch of a load device.

Optionally, the network device 30 in this embodiment of this application is a device that connects the terminal device 40 to a wireless network. The network device 30 may be a node in a radio access network, and may be referred to as a base station, or may be referred to as a radio access network (RAN) node (or device). For example, the network device may include an evolved NodeB (eNB or e-NodeB) or evolutional Node B in an LTE) system or an LTE-advanced (LTE-A) system, for example, a conventional macro base station eNB and a micro base station eNB in a heterogeneous network scenario; or may include a next generation NodeB (gNB) in a 5G NR system; or may include a transmission reception point (TRP), a home base station (for example, a home evolved NodeB, or a home NodeB (HNB)), a baseband unit (BBU), a baseband pool BBU pool, a Wi-Fi access point (AP), or the like; or may include a centralized unit (CU) and a distributed unit (DU) in a cloud access network (e.g., a cloud RAN) system; or may include a base station in a non-terrestrial network (NTN). That is, the base station may be deployed on a high altitude platform station or a satellite. In the NTN, the network device may serve as a layer 1 (L1) relay, a base station, a DU, or an integrated access and backhaul (IAB) node. Alternatively, the network device may be a device that implements a base station function in the IoT, for example, a device that implements a base station function in vehicle-to-everything (V2X), device-to-device (D2D), or machine-to-machine (M2M). This is not limited in this embodiment of this application.

Optionally, the base station in this embodiment of this application may include various forms of base stations, for example, a macro base station, a micro base station (also referred to as a small cell), a relay station, an access point, a next generation NodeB (gNodeB or gNB), a home base station (for example, a home evolved NodeB or a home NodeB (HNB)), a baseband unit (BBU), a transmitting and receiving point (TRP), a transmitting point (TP), and a mobile switching center. This is not specifically limited in this embodiment of this application.

Optionally, the terminal device 40 in this embodiment of this application may be a device, such as a terminal or a chip that can be used in the terminal, configured to implement a wireless communication function. The terminal may be a user equipment (UE), an access terminal, a terminal unit, a terminal station, a mobile station, a remote station, a remote terminal, a mobile device, a wireless communication device, a terminal agent, a terminal apparatus, or the like in the 5G network or a future evolved public land mobile network (PLMN). The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. Alternatively, the terminal may be a terminal having a communication function in the IoT, for example, a terminal (for example, a vehicle-to-everything device) in the V2X, a terminal in D2D communication, or a terminal in M2M communication. The terminal may be mobile or fixed.

Optionally, the network device 30 and the terminal device 40 in this embodiment of this application may also be referred to as communication apparatuses, and each may be a general-purpose device or a dedicated device. This is not specifically limited in this embodiment of this application.

Figure 4:
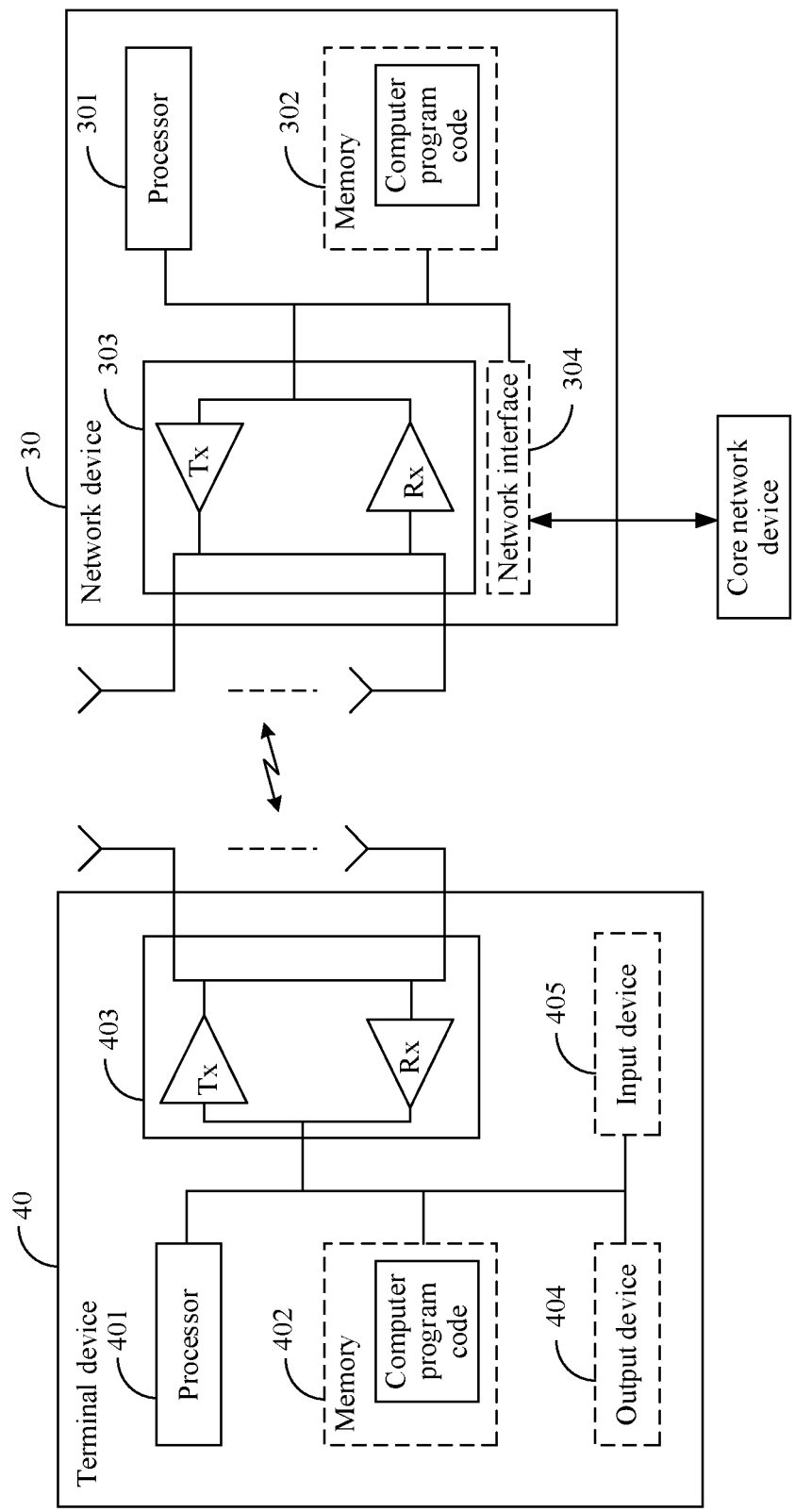
FIG. 4 is a schematic diagram of structures of a terminal device and a network device according to an embodiment of this application.

Optionally, FIG. 4 is a schematic diagram of structures of the network device 30 and the terminal device 40 according to this embodiment of this application.

The terminal device 40 includes at least one processor (an example in which one processor 401 is included is used for description in FIG. 4) and at least one transceiver (an example in which one transceiver 403 is included is used for description in FIG. 4). Optionally, the terminal device 40 may further include at least one memory (an example in which one memory 402 is included is used for description in FIG. 4), at least one output device (an example in which one output device 404 is included is used for description in FIG.

4), and at least one input device (an example in which one input device 405 is included is used for description in FIG. 4).

The processor 401, the memory 402, and the transceiver 403 are connected to each other through a communication line. The communication line may include a path for transmitting information between the foregoing components.

The processor 401 may be a general-purpose central processing unit (CPU), a microprocessor, an application-specific integrated circuit (ASIC), or one or more integrated circuits configured to control program execution of the solutions in this application. During implementation, in an embodiment, the processor 401 may alternatively include a plurality of CPUs, and the processor 401 may be a single-core (single-CPU) processor or a multi-core (multi-CPU) processor. The processor herein may be one or more devices, circuits, or processing cores configured to process data (for example, computer program instructions).

The memory 402 may be an apparatus having a storage function. For example, the memory 402 may be a read-only memory (ROM) or another type of static storage device that can store static information and instructions, or a random-access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compact optical disc, a laser disc, an optical disc, a digital versatile optical disc, a Blu-ray disc, or the like), a magnetic disk storage medium or another magnetic storage device, or any other medium that can be used to carry or store expected program code in a form of an instruction or a data structure and that can be accessed by a computer, but is not limited thereto. The memory 402 may exist independently, and is connected to the processor 401 through the communication line. The memory 402 may alternatively be integrated with the processor 401.

The memory 402 is configured to store computer-executable instructions for performing the solutions in this application, and the processor 401 controls execution of the computer-executable instructions. For example, the processor 401 is configured to execute the computer-executable instructions stored in the memory 402, to implement the bandwidth part switching method according to embodiments of this application.

Optionally, the computer-executable instructions in this embodiment of this application may also be referred to as application program code or computer program code. This is not specifically limited in this embodiment of this application.

The transceiver 403 may use any apparatus such as a transceiver, and is configured to communicate with another device or a communication network, for example, the Ethernet, a RAN, or a wireless local area network (WLAN). The transceiver 403 includes a transmitter (Tx) and a receiver (Rx).

The output device 404 communicates with the processor 401, and may display information in a plurality of manners. For example, the output device 404 may be a liquid-crystal display (LCD), a light-emitting diode (LED) display device, a cathode-ray tube (CRT) display device, a projector, or the like.

The input device 405 communicates with the processor 401, and may receive a user input in a plurality of manners. For example, the input device 405 may be a mouse, a keyboard, a touchscreen device, or a sensor device.

The network device 30 includes at least one processor (an example in which one processor 301 is included is used for description in FIG. 4) and at least one transceiver (an example in which one transceiver 303 is included is used for description in FIG. 4). Optionally, the network device 30 may further include at least one memory (an example in which one memory 302 is included is used for description in FIG. 4) and at least one network interface (an example in which one network interface 304 is included is used for description in FIG. 4). The processor 301, the memory 302, the transceiver 303, and the network interface 304 are connected through a communication line. The network interface 304 is configured to connect to a core network device through a link (such as an Si interface), or connect to a network interface of another network device through a wired or wireless link (such as an X2 interface) (where the connection is not shown in FIG. 4). This is not specifically limited in this embodiment of this application. In addition, for related descriptions about the processor 301, the memory 302, and the transceiver 303, refer to descriptions about the processor 401, the memory 402, and the transceiver 403 in the terminal device 40. Details are not described herein again.

It may be understood that the structures shown in FIG. 4 constitute no specific limitation on the network device 30 or the terminal device 40. For example, in some other embodiments of this application, the network device 30 or the terminal device 40 may include more or fewer components than those shown in FIG. 4, or some components may be combined, or some components may be split, or different component arrangements may be used. The components shown in the figure may be implemented by hardware, software, or a combination of software and hardware.

Figure 5:
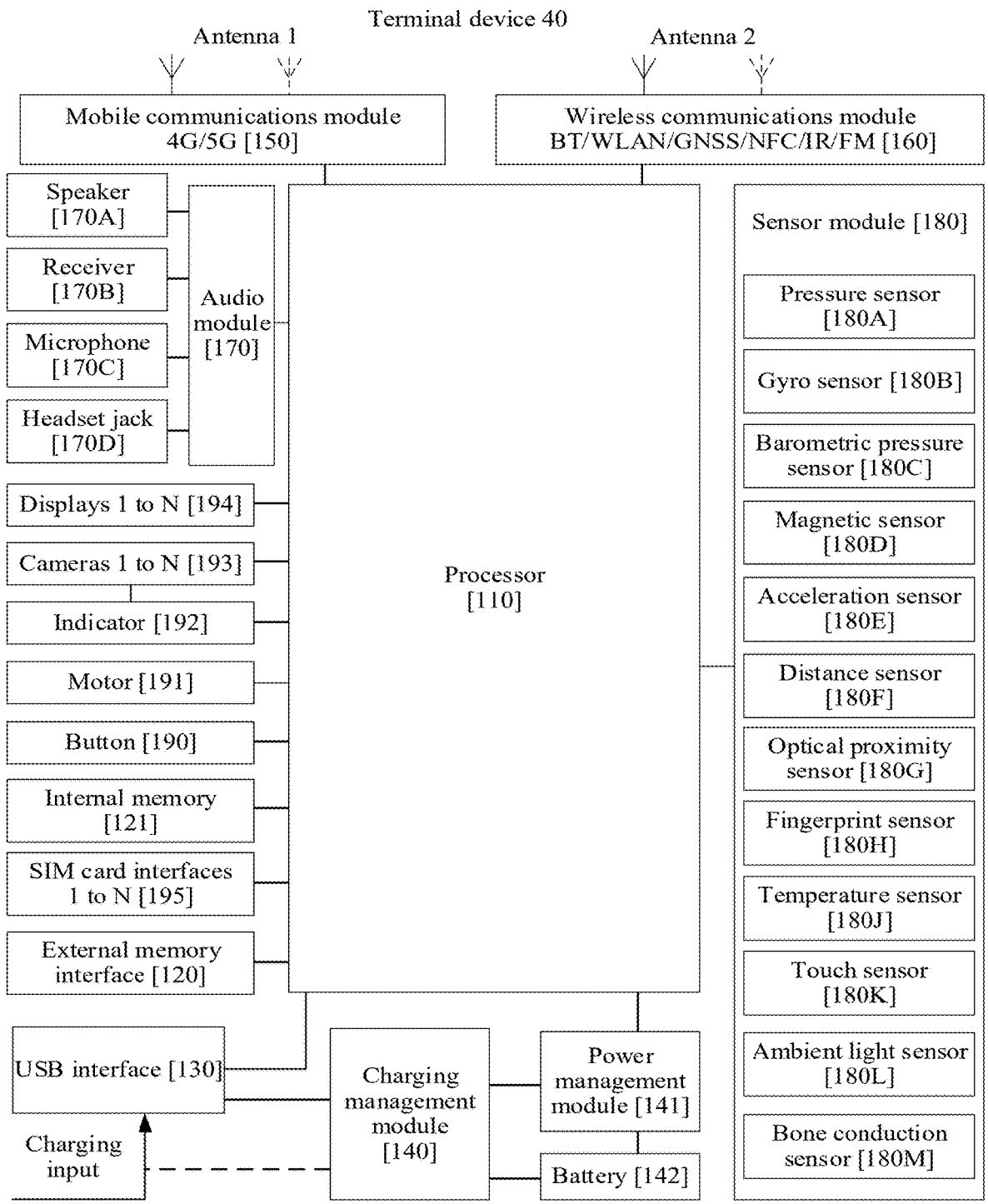
FIG. 5 is a schematic diagram of a structure of another terminal device according to an embodiment of this application.

With reference to the schematic diagram of the structure of the terminal device 40 shown in FIG. 4, for example, FIG. 5 is a structural form of the terminal device 40 according to an embodiment of this application.

In some embodiments, a function of the processor 401 in FIG. 4 may be implemented by a processor 110 in FIG. 5.

In some embodiments, a function of the transceiver 403 in FIG. 4 may be implemented using an antenna 1, an antenna 2, a mobile communication module 150, a wireless communication module 160, or the like in FIG. 5.

The antenna 1 and the antenna 2 are configured to transmit and receive an electromagnetic wave signal. Each antenna in the terminal device 40 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution, applied to the terminal device 40, to wireless communication including 4G/5G, or the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to a modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The wireless communication module 160 may provide a solution, applied to the terminal device 40, to wireless communication including a wireless local area network (WLAN) (for example, a Wi-Fi network), Bluetooth (BT), a global navigation satellite system (GNSS), frequency modulation (FM), near field communication (NFC), an infrared (IR) technology, or the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the terminal device 40, the antenna 1 is coupled to the mobile communication module 150, and the antenna 2 is coupled to the wireless communication module 160, such that the terminal device 40 can communicate with a network and another device using a wireless communication technology. The wireless communication technology may include LTE, BT, a GNSS, WLAN, NFC, FM, an IR technology, or the like.

In some embodiments, a function of the memory 402 in FIG. 4 may be implemented using an internal memory 121 in FIG. 5, an external memory (for example, a Micro secure digital (SD) card) connected to an external memory interface 120, or the like.

In some embodiments, a function of the output device 404 in FIG. 4 may be implemented using a display 194 in FIG. 5. The display 194 is configured to display an image, a video, and the like. The display 194 includes a display panel.

In some embodiments, a function of the input device 405 in FIG. 4 may be implemented using a mouse, a keyboard, a touchscreen device, or a sensor module 180 in FIG. 5. For example, as shown in FIG. 5, the sensor module 180 may include one or more of a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, and a bone conduction sensor 180M. This is not specifically limited in this embodiment of this application.

In some embodiments, as shown in FIG. 5, the terminal device 40 may further include one or more of an audio module 170, a camera 193, an indicator 192, a motor 191, a button 190, a SIM card interface 195, a USB port 130, a charging management module 140, a power management module 141, and a battery 142. The audio module 170 may be connected to a speaker 170A (also referred to as a "loudspeaker"), a receiver 170B (also referred to as an "earpiece"), a microphone 170C (also referred to as a "mic" or "mike"), a headset jack 170D, or the like. This is not specifically limited in this embodiment of this application.

It may be understood that the structure shown in FIG. 5 constitute no specific limitation on the terminal device 40. For example, in some other embodiments of this application, the terminal device 40 may include more or fewer components than those shown in the figure, or some components may be combined, some components may be split, or different component arrangements may be used. The components shown in the figure may be implemented by hardware, software, or a combination of software and hardware.

With reference to the accompanying drawings, the following describes in detail the bandwidth part switching method provided in embodiments of this application using an example in which the network device 30 interacts with any terminal device 40 shown in FIG. 3.

It should be noted that names of messages between network elements, names of parameters in the messages, or the like in the following embodiments of this application are merely examples, and there may be other names in an implementation. This is not specifically limited in embodiments of this application.

It may be understood that, in embodiments of this application, the terminal device and/or the network device may perform some or all steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application may need to be performed.

This application provides a bandwidth part switching method based on multi-color frequency division multiplexing. The method may be applied to an NTN scenario. Certainly, the method may be further applied to another scenario, for example, a scenario in which a network device is movable and moves at a relatively high speed. A scenario to which the method is applied is not specifically limited in this application, and the foregoing example scenario does not constitute any limitation on the method.

Figure 6:
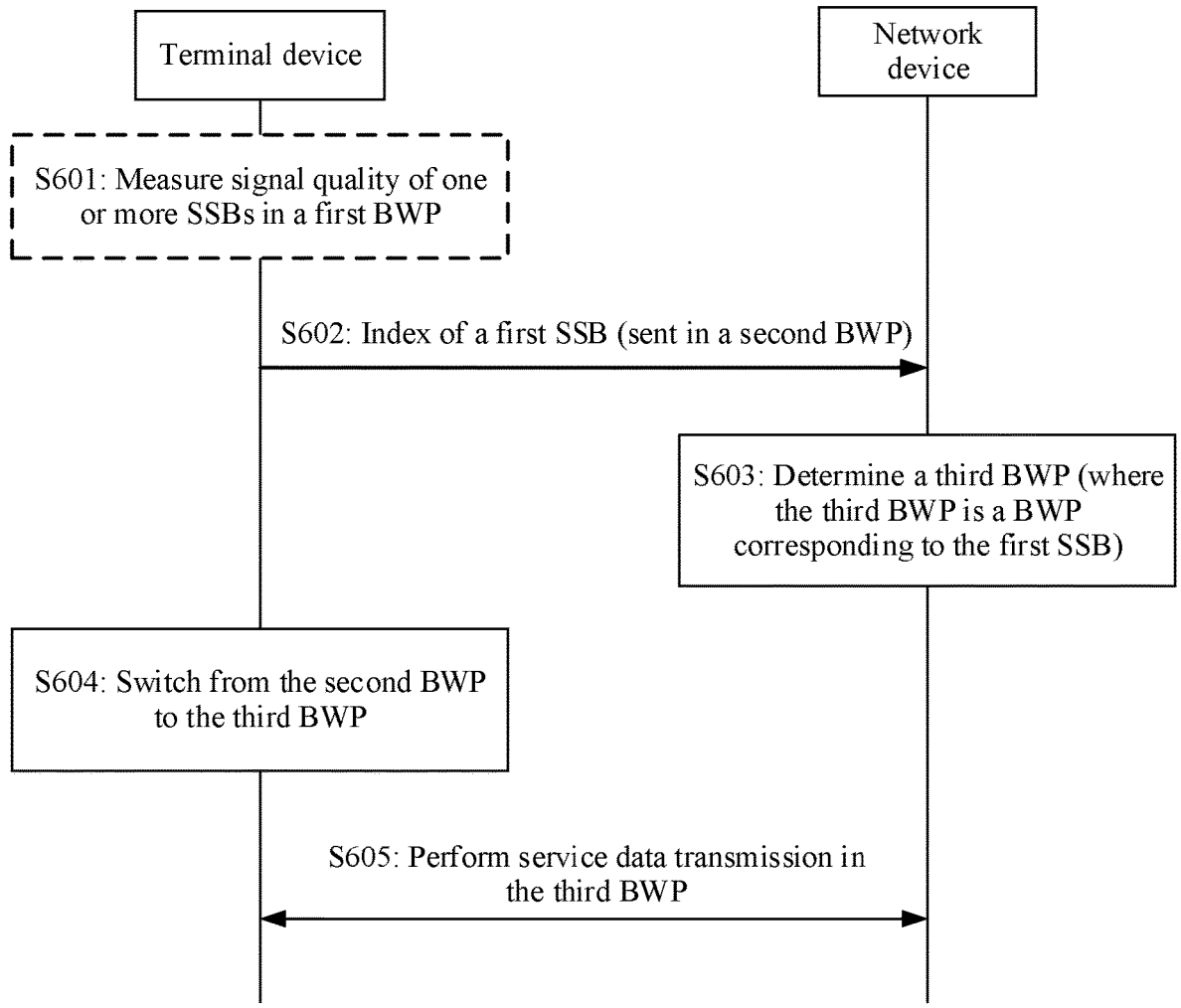
FIG. 6 is a schematic flowchart of a bandwidth part switching method according to an embodiment of this application.

FIG. 6 shows the bandwidth part switching method according to this application. The bandwidth part switching method includes the following steps.

S601: A terminal device measures signal quality of one or more SSBs in a first BWP.

The one or more SSBs correspond to at least one BWP other than the first BWP.

Optionally, a correspondence between the one or more SSBs and the at least one BWP may be a one-to-one correspondence, that is, one SSB corresponds to one BWP, and different SSBs correspond to different BWPs; or may be a many-to-one correspondence, that is, one SSB corresponds to one BWP, and different SSBs may correspond to a same BWP.

In other words, the first BWP is a synchronization frequency band of the at least one BWP, that is, the one or more SSBs are sent in the first BWP in a time division manner, and each SSB corresponds to one BWP other than the first BWP. For example, based on the four-color frequency division multiplexing shown in FIG. 2, the first BWP may be the BWP 0, the one or more SSBs may be the SSB 0 to the SSB 7, and the at least one BWP other than the first BWP is the BWP 1 to the BWP 3.

It should be noted that, in this application, multi-color frequency division multiplexing is not limited to the four-color frequency division multiplexing, and may be other positive integer color frequency division multiplexing, for example, three-color frequency division multiplexing or five-color frequency division multiplexing.

Optionally, that a terminal device measures signal quality of one or more SSBs in a first BWP may include: The terminal device measures the signal quality of the one or more SSBs in the first BWP based on third configuration information. The third configuration information is used to configure a frequency for inter-frequency measurement and/or a measurement gap for the inter-frequency measurement. The frequency for the inter-frequency measurement is a center frequency of the first BWP. Correspondingly, the measurement gap for the inter-frequency measurement is an inter-frequency measurement gap corresponding to the first BWP.

It should be noted that "first configuration information" and "second configuration information" in this application are described in subsequent embodiments. Details are not described herein.

Optionally, the third configuration information may be sent by the network device to the terminal device. To be more specific, before step S601, the method further includes: The network device sends the third configuration information to the terminal device, and correspondingly, the terminal device receives the third configuration information from the network device.

Optionally, the configured frequency for the inter-frequency measurement is the center frequency of the first BWP, the measurement gap is the inter-frequency measurement gap corresponding to the first BWP, and SSBs corresponding to different BWPs are all located in the first BWP. Therefore, when measuring signal quality based on the third configuration information, the terminal device switches to the first BWP to measure signal quality of the SSBs corresponding to different BWPs in the first BWP, and does not need to switch to each BWP to measure signal quality of a channel state information reference signal (channel state information reference signal, CSI-RS) in the BWP.

Figure 7A:
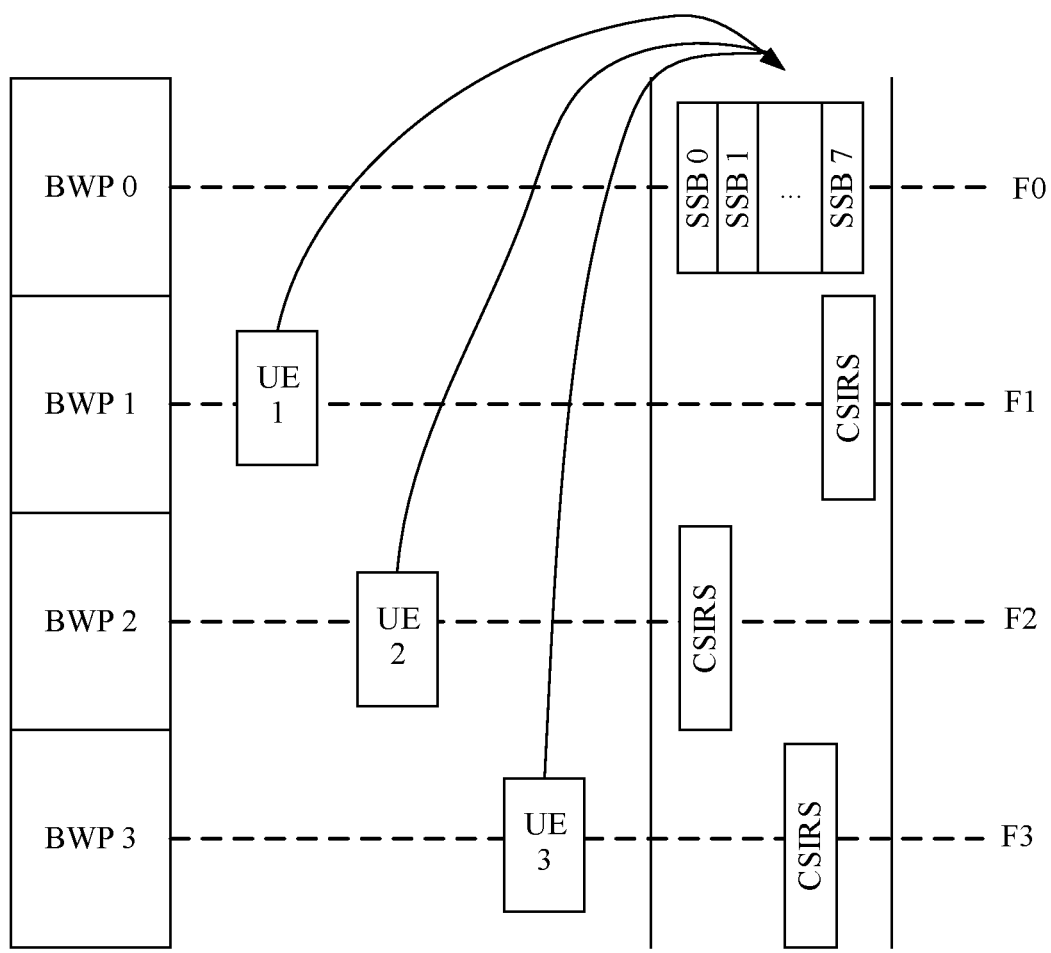
FIG. 7A is a schematic diagram of a type of inter-frequency measurement according to an embodiment of this application.
Figure 7B:
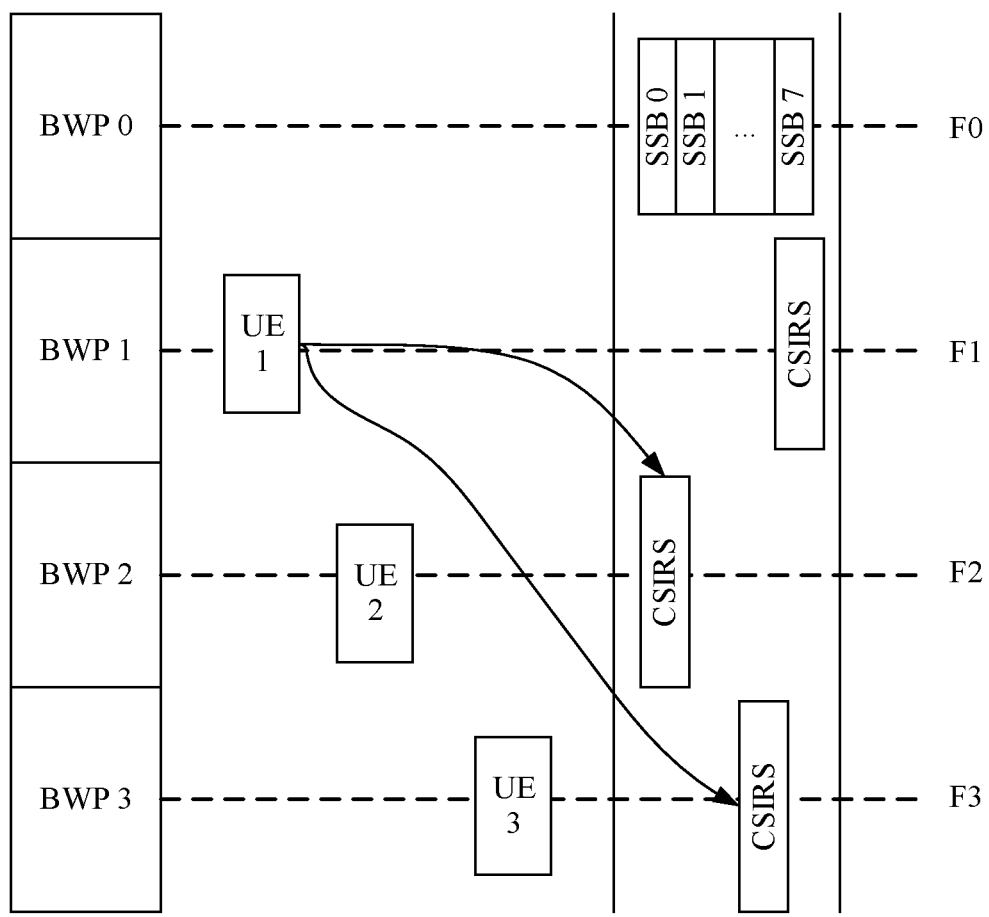
FIG. 7B is a schematic diagram of another type of inter-frequency measurement according to an embodiment of this application.

For example, the four-color frequency division multiplexing shown in FIG. 2 is used as an example. As shown in FIG. 7A and FIG. 7B, F0 to F3 respectively are center frequencies of the BWP 0 to the BWP 3, the SSB 0 to the SSB 7 in the BWP 0 correspond to the BWP 1 to the BWP 3, and each of the BWP 1 to the BWP 3 includes a terminal device-level CSI-RS.

FIG. 7A is a schematic diagram of inter-frequency measurement according to this application. In this solution, the frequency for the inter-frequency measurement is the center frequency F0 of the BWP 0, and the measurement gap is a measurement gap corresponding to a BWP. UE served by each BWP switches to the BWP 0 based on the measurement frequency and the measurement gap, to measure signal quality of the SSB 0 to the SSB 7. In a solution shown in FIG. 7B, the UE served by each BWP needs to switch to other BWPs based on measurement frequencies and measurement gaps corresponding to the other BWPs to measure signal quality of CSI-RSs in the other BWPs. For example, UE served by the BWP 1 needs to switch to the BWP 2 to measure signal quality of a CSI-RS in the BWP 2, and switch to the BWP 3 to measure signal quality of a CSI-RS in the BWP 3. Therefore, compared with the solution shown in FIG. 7B, the inter-frequency measurement solution in this application allows a smaller quantity of inter-frequency measurement frequencies and measurement gaps to be configured. This reduces signaling overheads and measurement complexity of the UE.

Optionally, when signal quality of a CSI-RS corresponding to the terminal device in a second BWP is less than or equal to a second threshold, the terminal device may start to measure signal quality of the one or more SSBs in the first BWP.

It should be noted that the second BWP may be understood as a serving BWP of the terminal device. The "first threshold" in this application is described in subsequent embodiments, and details are not described herein.

According to this solution, because the serving BWP of the terminal device is the second BWP, and BWP switching does not need to be performed when the signal quality of the CSI-RS corresponding to the terminal device in the second BWP is obtained. In this case, it is determined, based on the signal quality of the CSI-RS, whether to start to measure the signal quality of the one or more SSBs in the first BWP. This can reduce implementation complexity of the terminal device.

Optionally, the signal quality in this application may be represented by reference signal received power (RSRP) or reference signal received quality (RSRQ), or certainly may be represented by another parameter. This is not specifically limited in this application.

It should be noted that step S601 is an optional step. To be more specific, the terminal device does not necessarily perform step S601. When step S601 is not performed, the terminal device may obtain the signal quality of the one or more SSBs in the first BWP in another manner. This is not specifically limited in this application.

S602: The terminal device sends an index of a first SSB to the network device in the second BWP. Correspondingly, the network device receives the index of the first SSB from the terminal device in the second BWP.

Signal quality of the first SSB is greater than or equal to a first threshold, and the first SSB is one of the one or more SSBs in the first BWP.

Optionally, in the one or more SSBs in the first BWP, there may be a plurality of SSBs whose signal quality is greater than the first threshold. In this case, the first SSB may be an SSB whose signal quality is highest in the plurality of SSBs whose signal quality is greater than the first threshold. For example, based on the example shown in FIG. 2, if SSBs whose signal quality is greater than the first threshold in the SSB 0 to the SSB 7 are the SSB 1 and the SSB 2, and signal quality of the SSB 1 is greater than signal quality of the SSB 2, the first SSB is the SSB 1.

Optionally, the first threshold may be predefined in a protocol, may be indicated by the network device to the terminal device, or may be determined by the terminal device. This is not specifically limited in this application.

S603: The network device determines a third BWP.

The third BWP is a BWP that is in the at least one BWP other than the first BWP and that corresponds to the first SSB.

Optionally, the network device may determine, based on a correspondence between an SSB and a BWP and the index of the first SSB reported by the terminal device, the BWP corresponding to the first SSB, namely, the third BWP.

Optionally, after determining the third BWP, the network device may determine that the third BWP needs to be subsequently used to communicate with the terminal device, or may determine that the terminal device is to switch to the third BWP, or has switched to the third BWP.

S604: The terminal device switches from the second BWP to a third BWP.

The third BWP is a BWP that is in the at least one BWP other than the first BWP and that corresponds to the first SSB. In other words, the third BWP determined by the terminal device is the same as that determined by the network device, or the terminal device and the network device reach BWP synchronization. For example, based on the example shown in FIG. 2, if the first SSB is the SSB 1, the third BWP is the BWP 2.

Optionally, that the terminal device switches from the second BWP to a third BWP may include: The terminal device switches from the second BWP to the third BWP in an $N^{th}$ time unit after a first time unit, where the first time unit is a time unit occupied when the terminal device sends the index of the first SSB to the network device.

Optionally, the time unit in this application may be a slot, a subframe, a half-frame, a radio frame (or referred to as a frame), or a superframe. This is not specifically limited in this embodiment of this application.

Optionally, N may be predefined in a protocol, may be indicated by the network device to the terminal device, or may be determined by the terminal device. In this case, the terminal device may send N to the network device, such that the network device determines time at which the terminal device switches to the third BWP.

It may be understood that, when the terminal device switches to the third BWP, the terminal device also correspondingly switches to a beam corresponding to the first SSB. The beam corresponds to the third BWP, that is, a frequency corresponding to the beam is a center frequency of the third BWP.

It may be understood that, when the terminal device switches from the second BWP to the third BWP, the serving BWP of the terminal device changes from the second BWP to the third BWP.

S605: The network device performs service data transmission with the terminal device in the third BWP.

Optionally, after the terminal device switches to the third BWP, the network device performs the service data transmission with the terminal device in the third BWP.

According to this solution, when signal quality of the first SSB in the second BWP is greater than the first threshold, the terminal device switches from the second BWP to the third BWP corresponding to the first SSB, to complete BWP switching without using a signaling indication of the network device. This reduces signaling overheads and improves BWP switching efficiency. The terminal device sends the index of the first SSB to the network device, such that the network device can determine the third BWP. Therefore, BWPs of the network device and the terminal device are synchronized, to facilitate service data transmission.

In an implementation scenario of this application, in step S601, when there are a plurality of SSBs whose signal quality is greater than the first threshold, the terminal device may alternatively send indexes of the plurality of SSBs to the network device. The network device selects one of the plurality of SSBs, and then indicates the terminal device to switch to a BWP corresponding to the SSB selected by the network device.

The foregoing describes the BWP switching method for the terminal device in a connected mode based on the multi-color frequency division multiplexing. In addition, BWPs are classified in this application, and the following provides detailed descriptions.

In a possible implementation, the second BWP and/or the third BWP in this application include/includes a first sub-BWP and one or more second sub-BWPs. The first sub-BWP is used for transmission of configuration information and/or system information corresponding to an SSB, and the second sub-BWP is used for service data transmission.

Optionally, the system information corresponding to the SSB may include a configuration parameter of a beam corresponding to the SSB. The configuration parameter is beam-level common information, and is valid for each terminal device using the beam.

Optionally, the configuration parameter of the beam corresponding to the SSB may include but is not limited to one or more of the following: a timing advance (TA) rate, a Doppler pre-compensation value, common TA, beam-level timing offset (K-Offset-BEAM), and the like.

Optionally, in this application, each of the at least one BWP other than the first BWP includes a first sub-BWP and one or more second sub-BWPs.

Figure 8A:
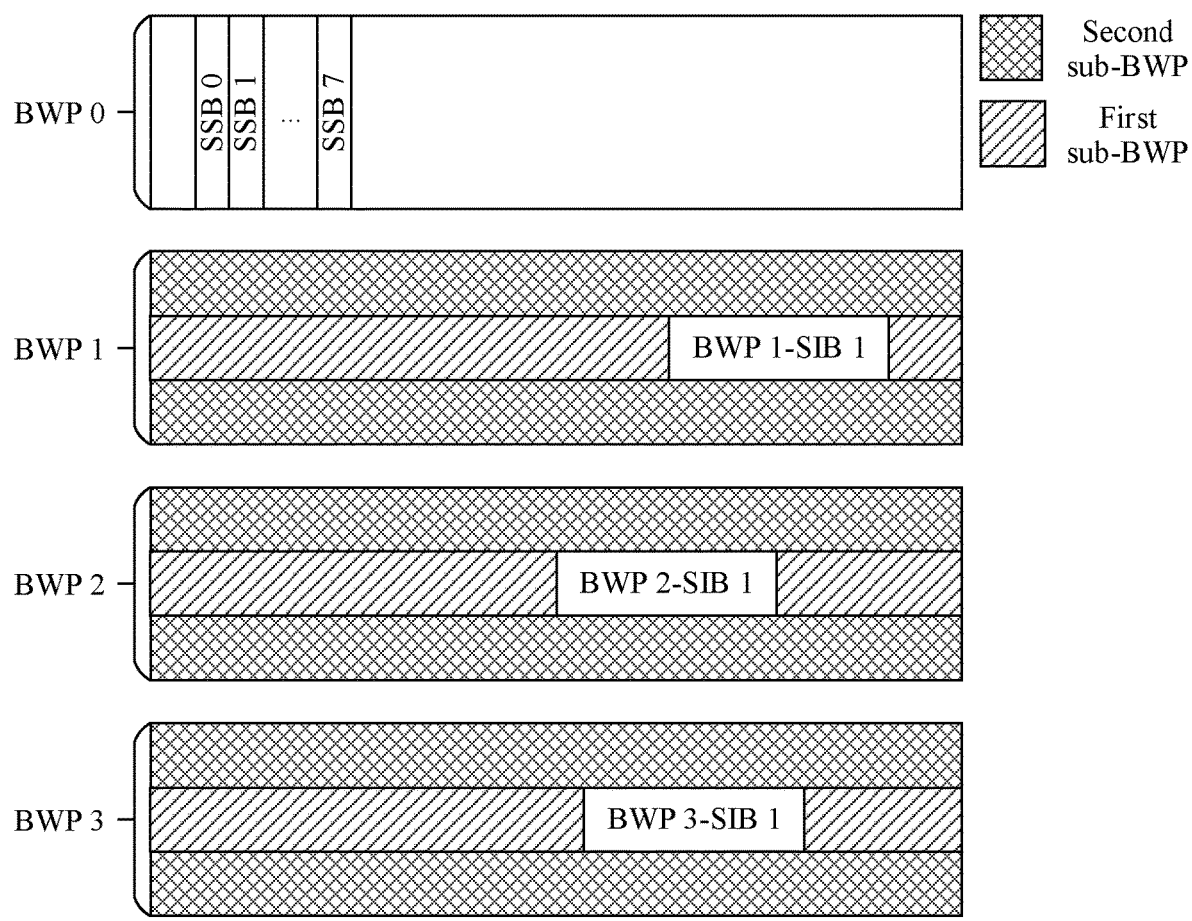
FIG. 8A is a schematic diagram of a structure of a BWP according to an embodiment of this application.

For example, based on the example shown in FIG. 2, the first BWP is the BWP 0, and BWPs other than the first BWP are the BWP 1 to the BWP 3. As shown in FIG. 8A, each of the BWP 1 to the BWP 3 includes a first sub-BWP and two second sub-BWPs.

It should be noted that FIG. 8A shows only an example of BWP division. In actual application, sub-BWPs of different BWPs may have different division manners. This is not specifically limited in this application.

Optionally, the first sub-BWP may also be referred to as an initial BWP or an initial sub-BWP, and the second sub-BWP may also be referred to as a dedicated BWP or a dedicated sub-BWP. The system information corresponding to the SSB may be denoted as a BWP-system information block (SIB) 1, namely, a BWP-SIB 1. Certainly, the first sub-BWP and the second sub-BWP may have other names, and the system information corresponding to the SSB may alternatively be denoted as another identifier. This is not specifically limited in this application.

For example, a format of an information element (denoted as BWP-ConfigSIB1) used to configure the system information corresponding to the SSB may be shown as follows:

```
BWP-ConfigSIB1 ::= Sequence {
    taRate                      TA-Rate,
    doppler-pre-compensation    Doppler-Pre-Compensation,
    common-TA                   Common-TA,
    K-offset-Beam               K-Offset-BEAM,
    ...
}
```

It should be noted that, in actual application, the information element used to configure the system information corresponding to the SSB may have another name or format. This is not specifically limited in this application.

It should be noted that a BWP obtained in the division manner may be referred to as a two-level BWP. Certainly, the BWP may have another name. This is not specifically limited in this application.

Figure 8B:
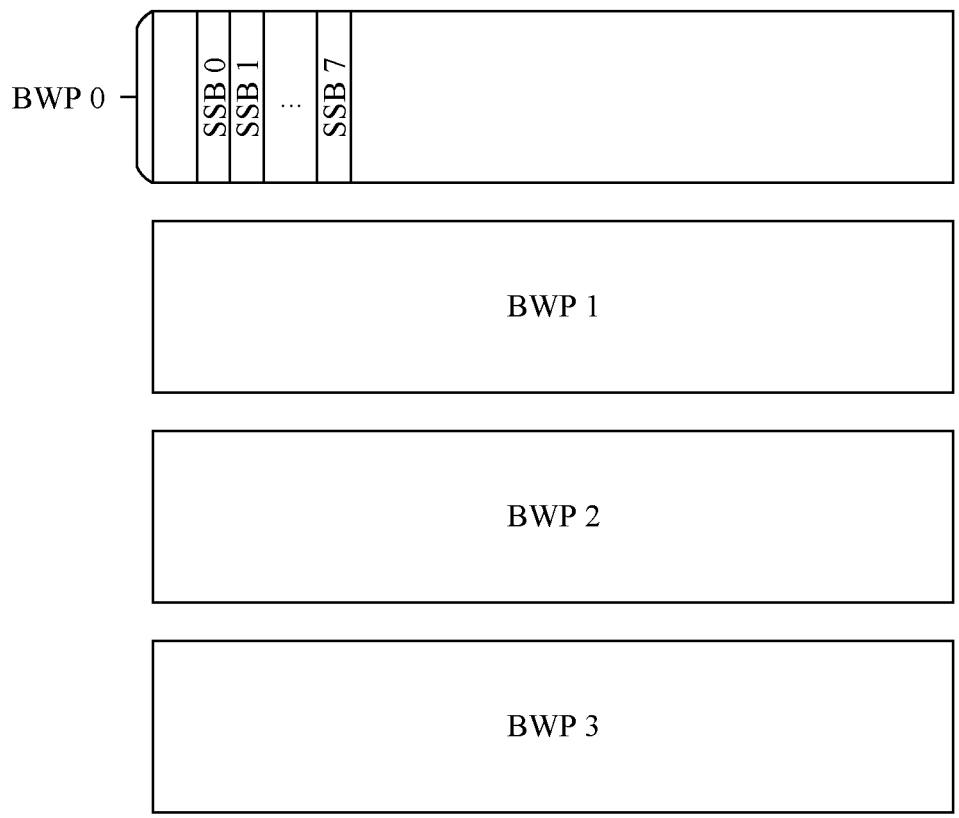
FIG. 8B is a schematic diagram of a structure of another BWP according to an embodiment of this application.

In another possible implementation, a BWP is not further divided in this application. For example, based on the example shown in FIG. 2, the first BWP is the BWP 0, and BWPs other than the first BWP are the BWP 1 to the BWP 3. As shown in FIG. 8B, each of the BWP 1 to the BWP 3 includes no sub-BWP.

It should be noted that a BWP that is not divided into sub-BWPs may be referred to as a one-level BWP. Certainly, the BWP may have another name. This is not specifically limited in this application.

Based on the foregoing BWP division, optionally, in a scenario in which the second BWP and/or the third BWP include/includes the first sub-BWP and the one or more second sub-BWPs, before step S605, the bandwidth part switching method in this application may further include the following steps.

The network device sends first configuration information in the first sub-BWP of the third BWP. Correspondingly, the terminal device receives the first configuration information in the first sub-BWP of the third BWP. The first configuration information is used to configure the one or more second sub-BWPs of the third BWP.

Optionally, after receiving the first configuration information, the terminal device may determine the one or more second sub-BWPs of the third BWP based on the first configuration information.

In this case, correspondingly, step S605 may include: The terminal device performs the service data transmission with the network device in a first active BWP, where the first active BWP is one of the one or more second sub-BWPs of the third BWP.

Optionally, the first active BWP may be indicated by the network device to the terminal device, or may be agreed upon by the network device and the terminal device. For example, the network device and the terminal device agree that a second sub-BWP that has a lowest frequency or a smallest number in the one or more second sub-BWPs of the third BWP is the first active BWP. This is not specifically limited in this application.

Optionally, before step S605 is performed, the bandwidth part switching method in this application may further include the following steps.

The network device sends system information corresponding to the first SSB in the first sub-BWP of the third BWP. Correspondingly, the terminal device receives the system information corresponding to the first SSB in the first sub-BWP of the third BWP. The system information corresponding to the first SSB includes a configuration parameter of the beam corresponding to the first SSB. The beam corresponding to the first SSB corresponds to the third BWP. In other words, the frequency of the beam corresponding to the first SSB is the center frequency of the third BWP.

Optionally, the configuration parameter of the beam corresponding to the first SSB may include one or more of TA-Rate, Doppler-Pre-Compensation, Common-TA, and K-Offset-BEAM.

In this case, correspondingly, step S605 may include: The terminal device performs service data transmission with the network device in a first active BWP based on the configuration parameter of the beam corresponding to the first SSB. For example, after completing downlink synchronization, the terminal device initiates random access based on Common-TA, and automatically adjusts uplink timing based on TA-Rate, to implement uplink synchronization. On this basis, an uplink and downlink time sequence relationship is determined based on the parameter K-Offset-BEAM. In this way, uplink and downlink service channels are established between the terminal device and the network device, and then corresponding service data transmission may be performed.

According to this solution, in a two-level BWP scenario, a BWP used for service communication is further divided in this application. In one aspect, flexibility of BWP division is improved. In another aspect, based on the further division, a requirement on an operating bandwidth of the terminal device can be reduced, and adaptability of the BWP to the terminal device can be improved. For example, a maximum bandwidth of an NR system is 400 M. In the four-color frequency division multiplexing, if the bandwidth is evenly allocated, bandwidths of the BWP 0 to the BWP 3 each are 100 M, and therefore the four-color frequency division multiplexing cannot operate for a terminal device that supports a maximum bandwidth of 20 M in an LTE or NR standard. In this application, a second sub-BWP is obtained through division in a BWP, such that the second sub-BWP in the BWP can be used for communication even if the operating bandwidth of the terminal device is less than a bandwidth of the entire BWP.

The foregoing describes the BWP switching method and the BWP division method for the terminal device in the connected mode based on the multi-color frequency division multiplexing. The following separately describes initial access procedures in a two-level BWP scenario and a one-level BWP scenario based on the multi-color frequency division multiplexing.

Figure 9:
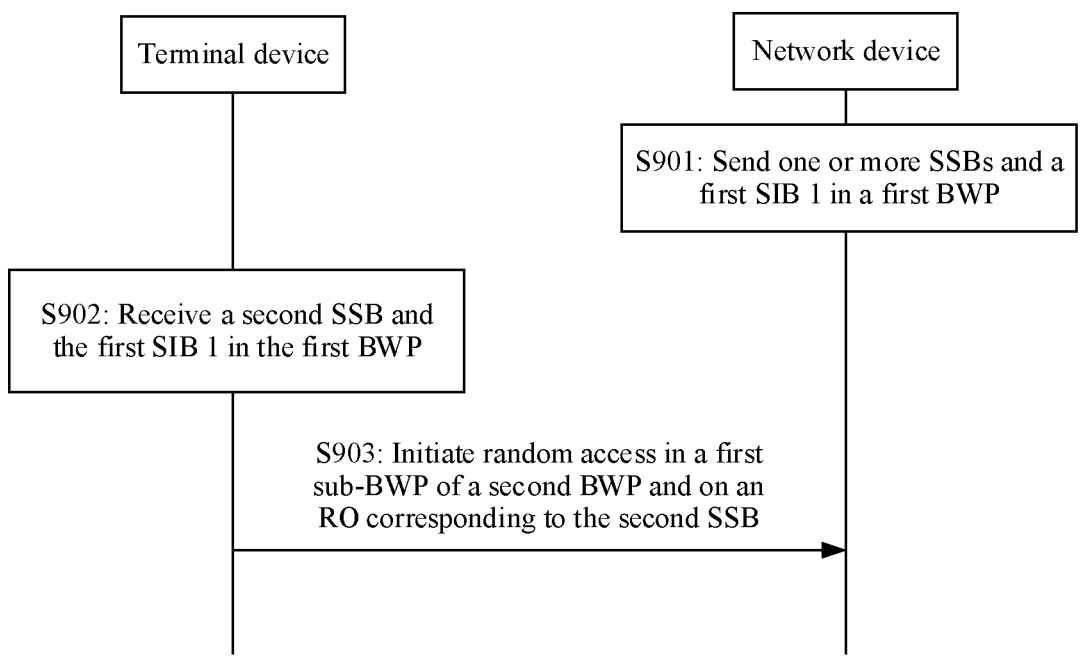
FIG. 9 is a schematic flowchart of a type of initial access according to an embodiment of this application.

In the two-level BWP scenario, as shown in FIG. 9, the initial access procedure includes the following steps.

S901: A network device sends one or more SSBs and a first SIB 1 in a first BWP.

The one or more SSBs are the same as the one or more SSBs in step S601.

Optionally, that a network device sends one or more SSBs in a first BWP may include: The network device scans beams of the one or more SSB in the first BWP in a time division manner, where the beams of the one or more SSB are in a one-to-one correspondence with the one or more SSBs.

Optionally, each of the one or more SSBs may include scheduling information of the first SIB 1. The scheduling information is used to indicate a time-frequency position of the first SIB 1, and the like. The network device may send the first SIB 1 in the time-frequency position indicated by the scheduling information.

Optionally, the first SIB 1 indicates one or more of the following: a mapping relationship between the one or more SSBs and at least one BWP other than the first BWP, a time domain position and/or a frequency domain position of a first sub-BWP of a second BWP, a time domain position and/or a frequency domain position of a first sub-BWP of a third BWP, or a time domain position of system information corresponding to each of the one or more SSBs.

Optionally, system information corresponding to different SSBs corresponding to a same BWP may have a same time domain position. In this case, for a plurality of SSBs having a same time domain position, the first SIB 1 may indicate one shared time domain position, to reduce signaling overheads. For example, based on the example shown in FIG. 2, both the SSB 1 and the SSB 4 correspond to the BWP 2, and system information corresponding to the SSB 1 and the SSB 4 is transmitted in the first sub-BWP of the BWP 2, that is, frequency domain positions may be the same. In addition, time domain positions of the system information corresponding to the SSB 1 and the SSB 4 may also be the same. Therefore, the first SIB 1 may indicate a shared time domain position for the SSB 1 and the SSB 4.

Optionally, for example, the BWP in this application is a downlink BWP. An initial downlink BWP-resource addition modification list (InitialDownlinkBWP-ResourceToAddModLis) field may be added to a downlink common SIB configuration (DownlinkConfigCommonSIB) information element of a serving cell common SIB configuration (ServingCellConfigCommonSIB) information element in the first SIB 1.

Optionally, the InitialDownlinkBWP-ResourceToAddModLis field is used to indicate a downlink BWP configuration (BWP-Config). The downlink BWP configuration may include a bwpID field and an ssbIndex field to indicate a mapping relationship between a BWP and an SSB, and may further include a bwpConfigSIB1Para field to indicate the time domain position and/or the frequency domain position of the first sub-BWP of the second BWP, the time domain position and/or the frequency domain position of the first sub-BWP of the third BWP, or the time domain position of the system information corresponding to each of the one or more SSBs.

For example, the four-color frequency division multiplexing shown in FIG. 2 is used as an example, and a format of the DownlinkConfigCommonSIB information element is shown as follows:

```
DownlinkConfigCommonSIB::= Sequence {
    ...
    InitialDownlinkBWP-ResourceToAddModList
    SEQUENCE (SIZE(1 . . . 3)) OF BWP-Config OPTIONAL,
    --Need N
    . . .
}
```

A format of the BWP-Config information element is shown as follows:

```
BWP-Config ::= Sequence {
    bwpID        BWP-ID INTEGER (1 . . . 3)
    OPTIONAL, -- Need S
    ssbIndex        SSB_Index SEQUENCE
    (SIZE (1 . . . max_SSB)) OF INTEGER (0 . . . N),
    bwpConfigSIB1Para   BWP-ConfigSIB1-Para,
    initialDownlinkBWP   BWP-DownlinkCommon
}
```

The initialDownlinkBWP field is used to indicate a common configuration parameter of the first sub-BWP.

Optionally, a signaling format of an uplink BWP configuration is similar to a signaling format of the downlink BWP configuration. To be more specific, a BWP-initialUplinkBWP field is added to an UplinkConfigCommonSIB information element of a ServingCellConfigCommonSIB information element in the first SIB 1. The BWP-initialUplinkBWP field is used to indicate the uplink BWP configuration. The uplink BWP configuration may include a bwpID field and an ssbIndex field to indicate the mapping relationship between a BWP and an SSB, and may further include a bwpConfigSIB1Para field to indicate the time domain position and/or the frequency domain position of the first sub-BWP of the second BWP, and the time domain position and/or the frequency domain position of the first sub-BWP of the third BWP. Compared with the downlink BWP configuration, the uplink BWP configuration does not need to indicate the system information corresponding to each SSB and the time domain position of the system information corresponding to each SSB. For detailed descriptions, refer to the foregoing related descriptions. Details are not described herein again.

It should be noted that the information element formats of the first SIB 1 and names of the information elements or fields are merely examples for description in this application. In actual application, there may be another information element format, information element name, and field name. This is not specifically limited in this application.

S902: A terminal device receives a second SSB and the first SIB 1 in the first BWP.

Optionally, the terminal device may search for, in the first BWP, the one or more SSBs sent by the network device, and finally receive (or find) one of the one or more SSBs. In this application, an example in which an SSB received by the terminal device is the second SSB is used for description.

Optionally, after receiving the second SSB, the terminal device may receive the first SIB 1 based on the scheduling information of the first SIB 1 in the second SSB, and determine, based on the mapping relationship between an SSB and a BWP included in the first SIB 1, a BWP corresponding to the second SSB. In this application, an example in which the BWP corresponding to the second SSB is the second BWP is used for description. Further, the terminal device may further determine the time domain position and/or the frequency domain position of the first sub-BWP of the second BWP based on the first SIB 1.

S903: The terminal device initiates random access in the first sub-BWP of the second BWP and on a random access channel (RACH) occasion (RO) corresponding to the second SSB.

Correspondingly, the network device detects, in the first sub-BWP of the second BWP and on the RO corresponding to the second SSB, the random access initiated by the terminal device.

Optionally, before step S903, the initial access procedure may further include the following steps.

The network device sends, in the first sub-BWP of the second BWP, system information corresponding to the second SSB. Correspondingly, the terminal device receives, in the first sub-BWP of the second BWP, the system information corresponding to the second SSB, where the system information corresponding to the second SSB includes a configuration parameter of a beam corresponding to the second SSB.

Optionally, the terminal device may receive, in the first sub-BWP of the second BWP based on the time domain position and/or the frequency domain position of the first sub-BWP of the second BWP and a time domain position of the system information corresponding to the second SSB that are indicated by the first SIB 1, the system information corresponding to the second SSB.

Optionally, the configuration parameter of the beam corresponding to the second SSB may include one or more of TA-Rate, Doppler-Pre-Compensation, Common-TA, and K-Offset-BEAM.

In this case, correspondingly, step S903 may include: The terminal device initiates, based on the configuration parameter of the beam corresponding to the second SSB, the random access in the first sub-BWP of the second BWP and on the RO corresponding to the second SSB. For example, the terminal device determines, based on Common-TA, a start position sent by an RACH, and then initiates, based on the second SSB detected in S902, the random access on the RO corresponding to the second SSB and in the first sub-BWP of the second BWP.

Optionally, because the RO is in a one-to-one correspondence with the SSB, when the terminal device initiates the random access on the RO corresponding to the second SSB, the network device may detect the random access on the RO corresponding to the second SSB, such that the network device may determine that an SSB found by the terminal device in the first BWP is the second SSB, and determine, based on the correspondence between the SSB and the BWP, that the BWP corresponding to the second SSB is the second BWP.

Optionally, after the random access succeeds, the network device may send second configuration information in the first sub-BWP of the second BWP. Correspondingly, the terminal device receives the second configuration information in the first sub-BWP of the second BWP. The second configuration information is used to configure the one or more second sub-BWPs of the second BWP. After receiving the second configuration information, the terminal device may determine the one or more second sub-BWPs of the second BWP based on the second configuration information.

Then, the terminal device performs the service data transmission with the network device in a second active BWP, where the second active BWP is one of the one or more second sub-BWPs of the second BWP.

Optionally, the second active BWP may be indicated by the network device to the terminal device, or may be agreed upon by the network device and the terminal device. For example, the network device and the terminal device agree that a second sub-BWP that has a lowest frequency or a smallest number in the one or more second sub-BWPs of the second BWP is the second active BWP. This is not specifically limited in this application.

Optionally, the network device may send the second configuration information in the first sub-BWP of the second BWP using radio resource control (RRC) reconfiguration signaling, or may send the second configuration information using other signaling. This is not specifically limited in this application.

It may be understood that, after the procedure shown in FIG. 9 is completed, the terminal device and the network device may perform the method shown in FIG. 6 to perform BWP switching.

Figure 10:
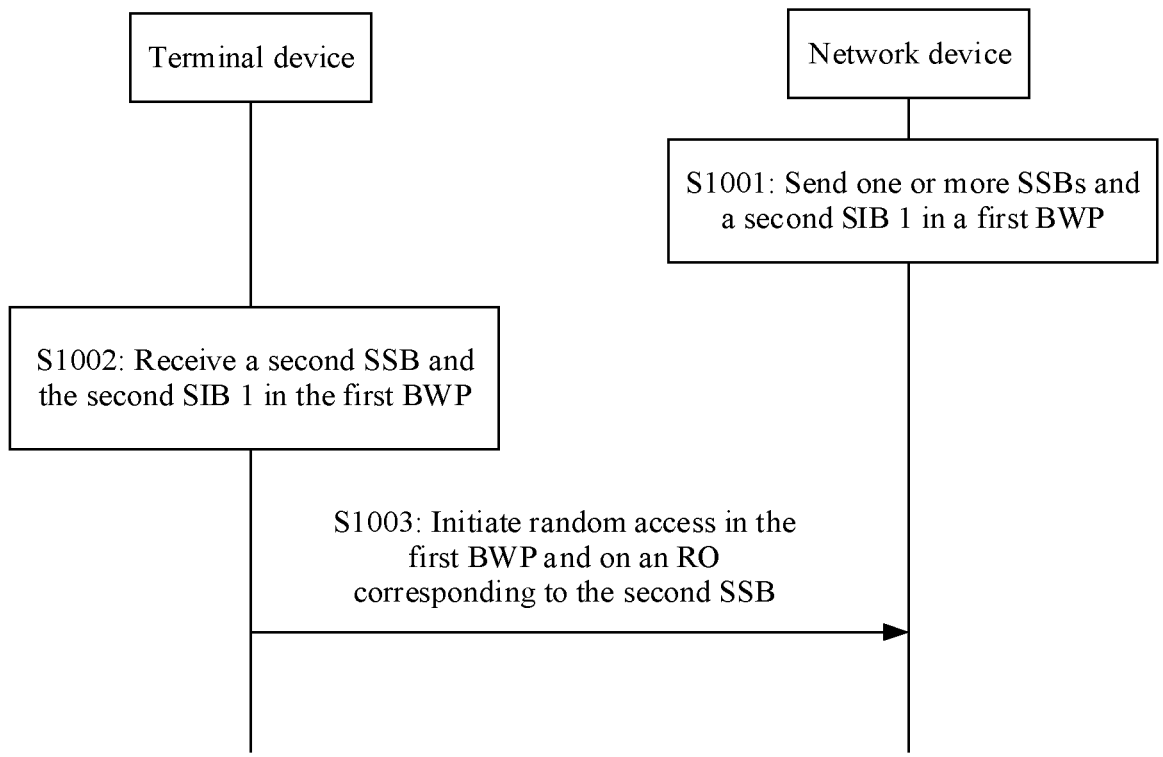
FIG. 10 is a schematic flowchart of another type of initial access according to an embodiment of this application.

In the one-level BWP scenario, as shown in FIG. 10, the initial access procedure includes the following steps.

S1001: A network device sends one or more SSBs and a second SIB 1 in a first BWP.

Step S1001 is similar to step S901. A difference lies in that information included in the second SIB 1 is different from information included in the first SIB. The second SIB 1 includes system information corresponding to each of the one or more SSBs, where the system information corresponding to the SSB includes a configuration parameter of a beam corresponding to the SSB.

Optionally, a bwp-Config field may be added to a ServingCellConfigCommonSIB information element in the second SIB 1, and the bwp-Config field is used to indicate the system information corresponding to the SSB.

For example, the four-color frequency division multiplexing shown in FIG. 2 is used as an example. A format of the ServingCellConfigCommonSIB information element may be shown as follows:

---

ServingCellConfigCommonSIB::=Sequence {
...
  bwp-Config    SEQUENCE  (SIZE(1 ... ssb_index))
  OF   BWP-ConfigSIB1 OPTIONAL,   -- Need N
  ...
}

---

BWP-ConfigSIB1 is an information element used to configure the system information corresponding to the SSB. For a format of the BWP-ConfigSIB1 information element, refer to the descriptions in the foregoing embodiment. Details are not described herein again.

Optionally, the second SIB 1 may further indicate a mapping relationship between the one or more SSBs and at least one BWP other than the first BWP.

S1002: The terminal device receives a second SSB and the second SIB 1 in the first BWP.

Step S1002 is similar to step S902. A difference lies in that sub-BWP division is not performed on a second BWP corresponding to the second SSB, and therefore the terminal device does not need to determine a position of a sub-BWP of the second BWP.

It should be noted that, when the second SIB 1 does not indicate the mapping relationship between the one or more SSBs and the at least one BWP other than the first BWP, the terminal device cannot determine that a BWP corresponding to the second SSB is the second BWP.

S1003: The terminal device initiates random access in the first BWP and on an RO corresponding to the second SSB.

Correspondingly, the network device detects, in the first BWP and on the RO corresponding to the second SSB, the random access initiated by the terminal device.

Optionally, the terminal device may initiate, based on the configuration parameter that is of the beam corresponding to the second SSB and that is included in the system information corresponding to the second SSB, the random access in the first BWP and on the RO corresponding to the second SSB. For details, refer to related descriptions of step S903. Details are not described herein again.

Optionally, after the random access succeeds, if the second SIB 1 does not indicate the mapping relationship between the one or more SSBs and the at least one BWP other than the first BWP, the network device further sends indication information to the terminal device in the first BWP, to indicate the mapping relationship between the one or more SSBs and the at least one BWP other than the first BWP. After receiving the indication information, the terminal device may determine that the BWP corresponding to the second SSB is the second BWP. Then, the terminal device may perform service data transmission with the network device in the second BWP.

For example, a downlink BWP is used as an example. When the network device sends the indication information to the terminal device to indicate the mapping relationship between the one or more SSBs and the at least one BWP other than the first BWP, an ssbIndex field may be added to a downlink BWP (BWP-Downlink) configuration indicated by a downlinkBWP-ToAddModLis field of a ServingCellConfig information element, to indicate the mapping relationship between the SSB and the BWP. That is, a format of the BWP-Downlink information element may be as follows:

---

BWP-Downlink ::= Sequence {
  bwp-Id   BWP-Id,
  ssbIndex  SSB_Index    SEQUENCE
  (SIZE (1 ... max_SSB)) OF INTEGER (0 ... N),
    bwp-Common BWP-DownlinkCommon  OPTIONAL,
    -- Cond SetupOtherBWP
    bwp-Dedicated BWP-DownlinkDedicated OPTIONAL,
    -- Cond SetupOtherBWP
  ...
}

---

The bwp-Common field is used to configure cell-level common configuration information of a BWP, for example, cell common configuration parameters of a physical downlink control channel (PDCCH) and a physical downlink shared channel (PDSCH). The bwp-Dedicated field is used to configure BWP specific configuration information of the terminal device, for example, specific configuration parameters of a PDCCH and a PDSCH of the terminal device. For detailed descriptions, refer to a definition in a related standard. Details are not described herein again.

Optionally, configuration of a mapping relationship between an uplink BWP and an SSB is similar to that of a mapping relationship between a downlink BWP and an SSB. For details, refer to the foregoing related descriptions. Details are not described herein again.

According to the foregoing solution, when the mapping relationship between the SSB and the BWP is indicated in the second SIB 1, signaling overheads are relatively low, such that signaling overheads can be reduced. When the mapping relationship between the SSB and the BWP is configured in RRC signaling, flexibility is relatively high, and there are relatively few modifications to the existing RRC signaling.

It should be noted that an indication manner of the mapping relationship between the SSB and the BWP is merely an example for description in this application. In actual application, there may be another indication manner. This is not specifically limited in this application.

It may be understood that, after the procedure shown in FIG. 10 is completed, the terminal device and the network device may perform the method shown in FIG. 6 to perform BWP switching.

In conclusion, this application provides the BWP switching procedure and the initial access procedures based on the multi-color frequency division multiplexing. It should be noted that the BWP switching procedure and the initial access procedure may be performed in combination, or may be performed independently. In other words, the BWP switching procedure does not depend on the initial access procedure, and the initial access procedure does not depend on the BWP switching procedure either.

In the embodiment shown in FIG. 6, FIG. 9, or FIG. 10, the processor 301 in the network device 30 shown in FIG. 4 may invoke application program code stored in the memory 302, to indicate the network device to perform an action performed by the network device. In the embodiment shown in FIG. 6, FIG. 9, or FIG. 10, the processor 401 in the terminal device 40 shown in FIG. 4 may invoke application program code stored in the memory 402, to indicate the terminal device to perform an action performed by the terminal device. This is not limited in this embodiment.

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

It may be understood that, in the foregoing embodiments, methods and/or steps implemented by the terminal device may alternatively be implemented by a component (for example, a chip or a circuit) that can be used in the terminal device, and methods and/or steps implemented by the network device may alternatively be implemented by a component (for example, a chip or a circuit) that can be used in the network device.

The foregoing mainly describes the solutions provided in this application from the perspective of interaction between devices. Correspondingly, this application further provides a communication apparatus. The communication apparatus is configured to implement the foregoing methods. The communication apparatus may be the terminal device in the foregoing method embodiments, an apparatus including the foregoing terminal device, or a component that can be used in the terminal device. Alternatively, the communication apparatus may be the network device in the foregoing method embodiments, an apparatus including the foregoing network device, or a component that can be used in the network device. It may be understood that, to implement the foregoing functions, the communication apparatus includes a hardware structure and/or a software module for performing a corresponding function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely logical function division. In actual implementation, another division manner may be used.

Figure 11:
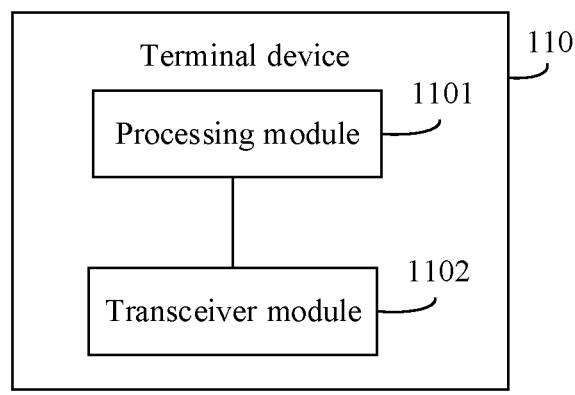
FIG. 11 is a schematic diagram of a structure of another terminal device according to an embodiment of this application.

For example, the communication apparatus is the terminal device in the foregoing method embodiments. FIG. 11 is a schematic diagram of a structure of a terminal device 110. The terminal device 110 includes a processing module 1101 and a transceiver module 1102. The transceiver module 1102 may also be referred to as a transceiver unit, and is configured to implement a sending and/or receiving function. For example, the transceiver module may be a transceiver circuit, a transceiver machine, a transceiver, or a communication interface.

Optionally, the transceiver module 1102 may include a receiving module and a sending module, which are respectively configured to perform receiving and sending steps performed by the terminal device in the foregoing method embodiments. The processing module 1101 may be configured to perform processing steps (for example, determining and obtaining) performed by the terminal device in the foregoing method embodiments.

The transceiver module 1102 is configured to send an index of a first synchronization signal/physical broadcast channel block SSB to a network device in a second bandwidth part BWP. Signal quality of the first SSB is greater than or equal to a first threshold, the first SSB is one of one or more SSBs in a first BWP, and the one or more SSBs correspond to at least one BWP other than the first BWP. The processing module 1101 is configured to switch from the second BWP to a third BWP, where the third BWP is a BWP that is in the at least one BWP and that corresponds to the first SSB.

Optionally, the transceiver module 1102 is further configured to receive first configuration information in a first sub-BWP of the third BWP, where the first configuration information is used to configure one or more second sub-BWPs of the third BWP. The transceiver module 1102 is further configured to perform service data transmission in a first active BWP, where the first active BWP is one of the one or more second sub-BWPs of the third BWP.

Optionally, the transceiver module 1102 is further configured to receive, in the first sub-BWP of the third BWP, system information corresponding to the first SSB, where the system information corresponding to the first SSB includes a configuration parameter of a beam corresponding to the first SSB.

Optionally, the transceiver module 1102 is further configured to receive a second SSB in the first BWP, where a BWP corresponding to the second SSB is the second BWP. The processing module 1101 is further configured to initiate random access in a first sub-BWP of the second BWP and on a random access channel occasion corresponding to the second SSB.

Optionally, the transceiver module 1102 is further configured to receive, in the first sub-BWP of the second BWP, system information corresponding to the second SSB, where the system information corresponding to the second SSB includes a configuration parameter of a beam corresponding to the second SSB.

Optionally, the transceiver module 1102 is further configured to receive second configuration information in the first sub-BWP of the second BWP, where the second configuration information is used to configure one or more second sub-BWPs of the second BWP. The transceiver module 1102 is further configured to perform the service data transmission in a second active BWP, where the second active BWP is one of the one or more second sub-BWPs of the second BWP.

Optionally, the transceiver module 1102 is further configured to receive a first system information block SIB 1 in the first BWP, where the first SIB 1 indicates one or more of the following: a mapping relationship between the one or more SSBs and the at least one BWP, a time domain position and/or a frequency domain position of the first sub-BWP of the second BWP and/or a time domain position and/or a frequency domain position of the first sub-BWP of the third BWP, or a time domain position of system information corresponding to each of the one or more SSBs.

Optionally, the processing module 1101 is configured to switch from the second BWP to the third BWP in an $N^{th}$ time unit after a first time unit, where the first time unit is a time unit occupied when the terminal device sends the index of the first SSB to the network device.

Optionally, the transceiver module 1102 is further configured to receive a second SSB in the first BWP, where a BWP corresponding to the second SSB is the second BWP. The processing module 1101 is further configured to initiate random access in the first BWP and on a random access channel occasion corresponding to the second SSB.

Optionally, the transceiver module 1102 is further configured to receive a second SIB 1 in the first BWP, where the second SIB 1 includes system information corresponding to each of the one or more SSBs.

Optionally, the transceiver module 1102 is further configured to receive indication information from the network device in the first BWP, where the indication information is used to indicate a mapping relationship between the one or more SSBs and the at least one BWP.

Optionally, the transceiver module 1102 is further configured to receive third configuration information from the network device. The third configuration information is used to configure a frequency for inter-frequency measurement and/or a measurement gap for the inter-frequency measurement, and the frequency for the inter-frequency measurement is a center frequency of the first BWP.

Optionally, the processing module 1101 is further configured to: when signal quality of a channel state information reference signal CSI-RS corresponding to the terminal device in the second BWP is less than or equal to a second threshold, measure signal quality of the one or more SSBs in the first BWP.

All related content of the steps in the foregoing method embodiments may be cited in function descriptions of the corresponding functional modules. Details are not described herein again.

In this embodiment, the terminal device 110 is presented with the functional modules obtained through division in an integrated manner. The "module" herein may be a specific ASIC, a circuit, a processor that executes one or more software or firmware programs, a memory, an integrated logic circuit, and/or another component capable of providing the foregoing functions. In a simple embodiment, a person skilled in the art may figure out that the terminal device 110 may be in a form of the terminal device 40 shown in FIG. 4.

For example, the processor 401 in the terminal device 40 shown in FIG. 4 may invoke the computer-executable instructions stored in the memory 402, such that the terminal device 40 performs the bandwidth part switching method in the foregoing method embodiments.

For example, the processor 401 in the terminal device 40 shown in FIG. 4 may invoke the computer-executable instructions stored in the memory 402, to implement functions/implementation processes of the processing module 1101 and the transceiver module 1102 in FIG. 11. Alternatively, the processor 401 in the terminal device 40 shown in FIG. 4 may invoke the computer-executable instructions stored in the memory 402, to implement functions/implementation processes of the processing module 1101 in FIG. 11, and the transceiver 403 in the terminal device 40 shown in FIG. 4 may implement functions/implementation processes of the transceiver module 1102 in FIG. 11.

Because the terminal device 110 provided in this embodiment may perform the foregoing bandwidth part switching method, for a technical effect that can be achieved by the terminal device 110, refer to the foregoing method embodiments. Details are not described herein again.

Figure 12:
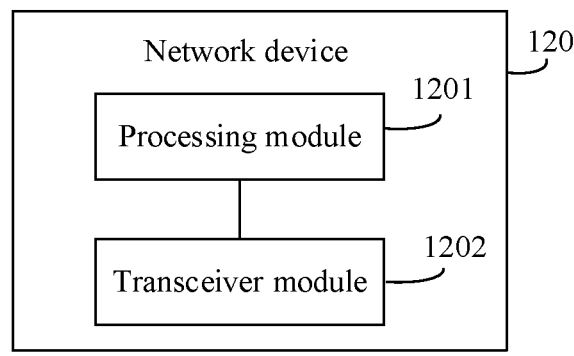
FIG. 12 is a schematic diagram of a structure of another network device according to an embodiment of this application.

For example, the communication apparatus is the network device in the foregoing method embodiments. FIG. 12 is a schematic diagram of a structure of a network device 120. The network device 120 includes a processing module 1201 and a transceiver module 1202. The transceiver module 1202 may also be referred to as a transceiver unit, and is configured to implement a sending and/or receiving function. For example, the transceiver module may be a transceiver circuit, a transceiver machine, a transceiver, or a communication interface.

Optionally, the transceiver module 1202 may include a receiving module and a sending module, which are respectively configured to perform receiving and sending steps performed by the network device in the foregoing method embodiments. The processing module 1201 may be configured to perform processing steps (for example, determining and obtaining) performed by the network device in the foregoing method embodiments.

The transceiver module 1202 is configured to receive an index of a first synchronization signal/physical broadcast channel block SSB from a terminal device in a second bandwidth part BWP. Signal quality of the first SSB is greater than or equal to a first threshold, the first SSB is one of one or more SSBs in a first BWP, and the one or more SSBs correspond to at least one BWP other than the first BWP. The processing module 1201 is configured to determine a third BWP, where the third BWP is a BWP that is in the at least one BWP and that corresponds to the first SSB. The transceiver module 1202 is further configured to perform service data transmission in the third BWP.

Optionally, the transceiver module 1202 is configured to perform the service data transmission in a first active BWP, where the first active BWP is one of one or more second sub-BWPs of the third BWP. The transceiver module 1202 is further configured to send first configuration information in a first sub-BWP of the third BWP, where the first configuration information is used to configure the one or more second sub-BWPs of the third BWP.

Optionally, the transceiver module 1202 is further configured to send, in the first sub-BWP of the third BWP, system information corresponding to the first SSB, where the system information corresponding to the first SSB includes a configuration parameter of a beam corresponding to the first SSB.

Optionally, the transceiver module 1202 is further configured to send a second SSB in the first BWP, where a BWP corresponding to the second SSB is the second BWP. The processing module 1201 is further configured to detect, in the first sub-BWP of the second BWP and on a random access channel occasion corresponding to the second SSB, random access initiated by the terminal device.

Optionally, the transceiver module 1202 is further configured to send, in the first sub-BWP of the second BWP, system information corresponding to the second SSB, where the system information corresponding to the second SSB includes a configuration parameter of a beam corresponding to the second SSB.

Optionally, the transceiver module 1202 is further configured to send second configuration information in the first sub-BWP of the second BWP, where the second configuration information is used to configure one or more second sub-BWPs of the second BWP. The transceiver module 1202 is further configured to perform the service data transmission in a second active BWP, where the second active BWP is one of the one or more second sub-BWPs of the second BWP.

Optionally, the transceiver module 1202 is further configured to send a first system information block SIB 1 in the first BWP, where the first SIB 1 indicates one or more of the following: a mapping relationship between the one or more SSBs and the at least one BWP, a time domain position and/or a frequency domain position of the first sub-BWP of the second BWP and/or a time domain position and/or a frequency domain position of the first sub-BWP of the third BWP, or a time domain position of system information corresponding to each of the one or more SSBs.

Optionally, the transceiver module 1202 is further configured to send the second SSB in the first BWP, and detect, in the first BWP and on a random access channel occasion corresponding to the second SSB, random access initiated by the terminal device, where a BWP corresponding to the second SSB is the second BWP.

Optionally, the transceiver module 1202 is further configured to send a second SIB 1 in the first BWP, where the second SIB 1 includes system information corresponding to each of the one or more SSBs.

Optionally, the transceiver module 1202 is further configured to send indication information to the terminal device in the first BWP, where the indication information is used to indicate a mapping relationship between the one or more SSBs and the at least one BWP.

Optionally, the transceiver module 1202 is further configured to send third configuration information to the terminal device. The third configuration information is used to configure a frequency for inter-frequency measurement and/or a measurement gap for the inter-frequency measurement, and the frequency for the inter-frequency measurement is a center frequency of the first BWP.

All related content of the steps in the foregoing method embodiments may be cited in function descriptions of the corresponding functional modules. Details are not described herein again.

In this embodiment, the network device 120 is presented in a form of functional modules obtained through division in an integrated manner. The "module" herein may be a specific ASIC, a circuit, a processor that executes one or more software or firmware programs, a memory, an integrated logic circuit, and/or another component capable of providing the foregoing functions. In a simple embodiment, a person skilled in the art may figure out that the network device 120 may be in a form of the network device 30 shown in FIG. 4.

For example, the processor 301 in the network device 30 shown in FIG. 4 may invoke the computer-executable instructions stored in the memory 302, such that the network device 30 performs the bandwidth part switching method in the foregoing method embodiments.

For example, the processor 301 in the network device 30 shown in FIG. 4 may invoke the computer-executable instructions stored in the memory 302, to implement functions/implementation processes of the processing module 1201 and the transceiver module 1202 in FIG. 12. Alternatively, the processor 301 in the network device 30 shown in FIG. 4 may invoke the computer-executable instructions stored in the memory 302, to implement functions/implementation processes of the processing module 1201 in FIG. 12, and the transceiver 303 in the network device 30 shown in FIG. 4 may implement functions/implementation processes of the transceiver module 1202 in FIG. 12.

Because the network device 120 provided in this embodiment may perform the foregoing bandwidth part switching method, for a technical effect that can be achieved by the network device 120, refer to the foregoing method embodiments. Details are not described herein again.

Optionally, an embodiment of this application further provides a communication apparatus. The communication apparatus includes a processor, configured to implement the method in any one of the foregoing method embodiments. In a possible design, the communication apparatus further includes a memory. The memory is configured to store necessary program instructions and necessary data. The processor may invoke program code stored in the memory, to indicate the communication apparatus to perform the method in any one of the foregoing method embodiments. Certainly, the communication apparatus may not include a memory. In another possible design, the communication apparatus further includes an interface circuit. The interface circuit is a code/data read/write interface circuit, and the interface circuit is configured to receive computer-executable instructions (where the computer-executable instructions are stored in a memory, and may be directly read from the memory, or may be read via another component) and transmit the computer-executable instructions to the processor. The communication apparatus may be a chip or a chip system. When the communication apparatus is a chip system, the communication apparatus may include a chip, or may include a chip and another discrete component. This is not specifically limited in this embodiment of this application.

Optionally, an embodiment of this application further provides a communication apparatus (for example, the communication apparatus may be a chip or a chip system). The communication apparatus includes an interface circuit and a logic circuit. The interface circuit is configured to obtain input information and/or generate output information. The logic circuit is configured to perform the method in any one of the foregoing method embodiments, and perform processing and/or generate the output information based on the input information.

When the communication apparatus is configured to implement a function of the terminal device in the foregoing method embodiments, the output information may be the index of the first SSB.

In some possible implementations, the input information may be first configuration information, where the first configuration information is used to configure one or more second sub-BWPs of a third BWP. Correspondingly, the performing processing based on the input information may be: performing service data transmission in a first active BWP. The first active BWP is one of the one or more second sub-BWPs of the third BWP.

In some possible implementations, the input information may be system information corresponding to the first SSB. The system information corresponding to the first SSB includes a configuration parameter of a beam corresponding to the first SSB. Correspondingly, the performing processing based on the input information may be: performing the service data transmission in the first active BWP based on the configuration parameter of the beam corresponding to the first SSB.

In some possible implementations, the input information may be a second SSB. Correspondingly, the performing processing based on the input information may be: initiating random access in a first sub-BWP of a second BWP and on a random access channel occasion corresponding to the second SSB.

In some possible implementations, the input information may be system information corresponding to the second SSB. The system information corresponding to the second SSB includes a configuration parameter of a beam corresponding to the second SSB. Correspondingly, the performing processing based on the input information may be: initiating, based on the configuration parameter of the beam corresponding to the second SSB, random access in a first sub-BWP of a second BWP and on a random access channel occasion corresponding to the second SSB.

In some possible implementations, the input information may be second configuration information, where the second configuration information is used to configure one or more second sub-BWPs of a second BWP. Correspondingly, the performing processing based on the input information may be: performing service data transmission in a second active BWP. The second active BWP is one of the one or more second sub-BWPs of the second BWP.

In some possible implementations, the input information may be a first SIB 1. Correspondingly, the performing processing based on the input information may be: determining, based on the first SIB 1, a BWP corresponding to the second SSB, a time domain position and/or a frequency domain position of the first sub-BWP of the second BWP and/or a time domain position and/or a frequency domain position of the first sub-BWP of the third BWP, or a time domain position of system information corresponding to each SSB.

In some possible implementations, the input information may be third configuration information. Correspondingly, the performing processing based on the input information may be: measuring signal quality of the one or more SSBs in the first BWP based on the third configuration information.

When the communication apparatus is configured to implement a function of the network device in the foregoing method embodiments, the input information may be the index of the first SSB. Correspondingly, the performing processing based on the input information may be: determining, based on the index of the first SSB, a BWP corresponding to the first SSB, namely, a third BWP.

The output information may be one or more of the following: first configuration information, system information corresponding to the first SSB, a second SSB, system information corresponding to the second SSB, second configuration information, a first SIB 1, third configuration information, or a second SIB 1.

Because the communication apparatus provided in this embodiment may perform the foregoing bandwidth part switching method, for a technical effect that can be achieved by the communication apparatus, refer to the foregoing method embodiments. Details are not described herein again.

In an embodiment, a bandwidth part switching method is provided. The method comprises receiving, by a network device, an index of a first synchronization signal/physical broadcast channel block SSB from a terminal device in a second bandwidth part BWP, wherein signal quality of the first SSB is greater than or equal to a first threshold, the first SSB is one of one or more SSBs in a first BWP, and the one or more SSBs correspond to at least one BWP other than the first BWP; determining, by the network device, a third BWP, wherein the third BWP is a BWP that is in the at least one BWP and that corresponds to the first SSB; and performing, by the network device, service data transmission in the third BWP.

In an aspect of the bandwidth part switching method, the second BWP and/or the third BWP comprise/comprises a first sub-BWP and one or more second sub-BWPs, the first sub-BWP is used for transmission of configuration information and/or system information corresponding to an SSB, and the second sub-BWP is used for service data transmission.

In one or more aspects of the bandwidth part switching method, the performing, by the network device, service data transmission in the third BWP comprises: performing, by the network device, the service data transmission in a first active BWP, wherein the first active BWP is one of the one or more second sub-BWPs of the third BWP; and the method further comprises: sending, by the network device, first configuration information in the first sub-BWP of the third BWP, wherein the first configuration information is used to configure the one or more second sub-BWPs of the third BWP.

In one or more aspects of the bandwidth part switching method, the method further comprises: sending, by the network device in the first sub-BWP of the third BWP, system information corresponding to the first SSB, wherein the system information corresponding to the first SSB comprises a configuration parameter of a beam corresponding to the first SSB.

In one or more aspects of the bandwidth part switching method, before the receiving, by the network device, an index of a first SSB from the terminal device in the second BWP, the method further comprises: sending, by the network device, a second SSB in the first BWP, wherein a BWP corresponding to the second SSB is the second BWP; and detecting, by the network device in the first sub-BWP of the second BWP and on a random access channel occasion corresponding to the second SSB, random access initiated by the terminal device.

In one or more aspects of the bandwidth part switching method, the method further comprises: sending, by the network device in the first sub-BWP of the second BWP, system information corresponding to the second SSB, wherein the system information corresponding to the second SSB comprises a configuration parameter of a beam corresponding to the second SSB.

In one or more aspects of the bandwidth part switching method, the method further comprises: sending, by the network device, second configuration information in the first sub-BWP of the second BWP, wherein the second configuration information is used to configure the one or more second sub-BWPs of the second BWP; and performing, by the network device, the service data transmission in a second active BWP, wherein the second active BWP is one of the one or more second sub-BWPs of the second BWP.

In one or more aspects of the bandwidth part switching method, the method further comprises: sending, by the network device, a first system information block SIB 1 in the first BWP, wherein the first SIB 1 indicates one or more of the following: a mapping relationship between the one or more SSBs and the at least one BWP, a time domain position and/or a frequency domain position of the first sub-BWP of the second BWP and/or a time domain position and/or a frequency domain position of the first sub-BWP of the third BWP, or a time domain position of system information corresponding to each of the one or more SSBs.

In an embodiment, a communication apparatus, wherein the communication apparatus comprises a processing module and a transceiver module; the transceiver module is configured to receive an index of a first synchronization signal/physical broadcast channel block SSB from a terminal device in a second bandwidth part BWP, wherein signal quality of the first SSB is greater than or equal to a first threshold, the first SSB is one of one or more SSBs in a first BWP, and the one or more SSBs correspond to at least one BWP other than the first BWP; the processing module is configured to determine a third BWP, wherein the third BWP is a BWP that is in the at least one BWP and that corresponds to the first SSB; and the transceiver module is further configured to perform service data transmission in the third BWP. In an aspect of the communication apparatus, the second BWP and/or the third BWP comprise/comprises a first sub-BWP and one or more second sub-BWPs, the first sub-BWP is used for transmission of configuration information and/or system information corresponding to an SSB, and the second sub-BWP is used for service data transmission.

In one or more aspects of the communication apparatus, wherein the transceiver module is configured to perform the service data transmission in a first active BWP, wherein the first active BWP is one of the one or more second sub-BWPs of the third BWP; and the transceiver module is further configured to send first configuration information in the first sub-BWP of the third BWP, wherein the first configuration information is used to configure the one or more second sub-BWPs of the third BWP.

In one or more aspects of the communication apparatus, the transceiver module is further configured to send, in the first sub-BWP of the third BWP, system information corresponding to the first SSB, wherein the system information corresponding to the first SSB comprises a configuration parameter of a beam corresponding to the first SSB.

In one or more aspects of the communication apparatus, the transceiver module is further configured to send a second SSB in the first BWP, wherein a BWP corresponding to the second SSB is the second BWP; and the processing module is further configured to detect, in the first sub-BWP of the second BWP and on a random access channel occasion corresponding to the second SSB, random access initiated by the terminal device.

In one or more aspects of the communication apparatus, the transceiver module is further configured to send, in the first sub-BWP of the second BWP, system information corresponding to the second SSB, wherein the system information corresponding to the second SSB comprises a configuration parameter of a beam corresponding to the second SSB.

In one or more aspects of the communication apparatus, the transceiver module is further configured to send second configuration information in the first sub-BWP of the second BWP, wherein the second configuration information is used to configure the one or more second sub-BWPs of the second BWP; and the transceiver module is further configured to perform the service data transmission in a second active BWP, wherein the second active BWP is one of the one or more second sub-BWPs of the second BWP.

In one or more aspects of the communication apparatus, the transceiver module is further configured to send a first system information block SIB 1 in the first BWP, wherein the first SIB 1 indicates one or more of the following: a mapping relationship between the one or more SSBs and the at least one BWP, a time domain position and/or a frequency domain position of the first sub-BWP of the second BWP and/or a time domain position and/or a frequency domain position of the first sub-BWP of the third BWP, or a time domain position of system information corresponding to each of the one or more SSBs.

In an embodiment, a communication apparatus is provided, wherein the communication apparatus comprises a processor, wherein the processor is configured to execute a computer program or instructions stored in a memory, to enable the communication apparatus to perform the method according to any one or more aspects disclosed herein.

In an embodiment, a communication apparatus is provided, wherein the communication apparatus comprises an interface circuit and a logic circuit, wherein the interface circuit is configured to obtain input information and/or generate output information; and the logic circuit is configured to: perform the method according to any one or more aspects disclosed herein; and perform processing and/or generate the output information based on the input information.

In an embodiment, a computer-readable storage medium is provided, and configured to store instructions, wherein when the instructions are executed, the method according to any one or more aspects disclosed herein is implemented.

In an embodiment, a computer program product is provided, wherein when the computer program product runs on a communication apparatus, wherein the communication apparatus is enabled to perform the method according to any one or more aspects disclosed herein.

All or some of the foregoing embodiments may be implemented using software, hardware, firmware, or any combination thereof. When a software program is used to implement embodiments, all or some of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like. In embodiments of this application, the computer may include the apparatus described above.

Although this application is described with reference to embodiments, in a process of implementing this application that claims protection, a person skilled in the art may understand and implement another variation of the disclosed embodiments by viewing the accompanying drawings, disclosed content, and appended claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to example features and embodiments thereof, it is clear that various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A bandwidth part switching method, comprising:
sending, by a terminal device, an index of a first synchronization signal (SS)/physical broadcast channel (PBCH) block (SSB) to a network device in a second bandwidth part (BWP), wherein a signal quality of the first SSB is greater than or equal to a first threshold, wherein the first SSB is one of one or more SSBs in a first BWP, and wherein the one or more SSBs correspond to at least one BWP other than the first BWP; and
switching, by the terminal device, from the second BWP to a third BWP,
wherein the third BWP is a BWP that is in the at least one BWP and that corresponds to the first SSB.

2. The bandwidth part switching method according to claim 1, wherein at least one of the second BWP or the third BWP comprises a first sub-BWP and one or more second sub-BWPs, wherein the first sub-BWP is for transmission of configuration information and/or system information corresponding to an SSB, and wherein the one or more second sub-BWPs are for service data transmission.

3. The bandwidth part switching method according to claim 2, further comprising:

receiving, by the terminal device, first configuration information in the first sub-BWP of the third BWP, wherein the first configuration information is to configure the one or more second sub-BWPs of the third BWP; and
performing, by the terminal device, the service data transmission in a first active BWP, wherein the first active BWP is one of the one or more second sub-BWPs of the third BWP.

4. The bandwidth part switching method according to claim 2, further comprising receiving, by the terminal device in the first sub-BWP of the third BWP, first system information corresponding to the first SSB, wherein the first system information comprises a configuration parameter of a beam corresponding to the first SSB.

5. The bandwidth part switching method according to claim 2, wherein before sending the index of the first SSB, the bandwidth part switching method further comprises:
receiving, by the terminal device, a second SSB in the first BWP, wherein a BWP corresponding to the second SSB is the second BWP; and
initiating, by the terminal device, random access in the first sub-BWP of the second BWP and on a random access channel occasion corresponding to the second SSB.

6. The bandwidth part switching method according to claim 5, further comprising receiving, by the terminal device in the first sub-BWP of the second BWP, second system information corresponding to the second SSB, wherein the second system information comprises a configuration parameter of a beam corresponding to the second SSB.

7. The bandwidth part switching method according to claim 5, further comprising:
receiving, by the terminal device, second configuration information in the first sub-BWP of the second BWP, wherein the second configuration information is to configure the one or more second sub-BWPs of the second BWP; and
performing, by the terminal device, the service data transmission in a second active BWP, wherein the second active BWP is one of the one or more second sub-BWPs of the second BWP.

8. The bandwidth part switching method according to claim 5, further comprising receiving, by the terminal device, a first system information block (SIB 1) in the first BWP, wherein the first SIB 1 indicates one or more of: a mapping relationship between the one or more SSBs and the at least one BWP, a first time domain position and/or a first frequency domain position of the first sub-BWP of the second BWP, a second time domain position and/or a second frequency domain position of the first sub-BWP of the third BWP, or a third time domain position of system information corresponding to each of the one or more SSBs.

9. The bandwidth part switching method according to claim 1, wherein switching from the second BWP to the third BWP comprises switching, by the terminal device, from the second BWP to the third BWP in an $N^{th}$ time unit after a first time unit, and wherein the first time unit is a time unit occupied when the terminal device sends the index of the first SSB to the network device.

10. A communication apparatus, comprising:
a transceiver configured to send an index of a first synchronization signal (SS)/physical broadcast channel (PBCH) block (SSB) to a network device in a second bandwidth part (BWP), wherein signal quality of the first SSB is greater than or equal to a first threshold, wherein the first SSB is one of one or more SSBs in a first BWP, and wherein the one or more SSBs correspond to at least one BWP other than the first BWP; and
a processor configured to switch from the second BWP to a third BWP,
wherein the third BWP is a BWP that is in the at least one BWP and that corresponds to the first SSB.

11. The communication apparatus according to claim 10, wherein at least one of the second BWP or the third BWP comprises a first sub-BWP and one or more second sub-BWPs, wherein the first sub-BWP is for transmission of configuration information and/or system information corresponding to an SSB, and wherein the second sub-BWP is for service data transmission.

12. The communication apparatus according to claim 11, wherein the transceiver is further configured to:
receive first configuration information in the first sub-BWP of the third BWP, wherein the first configuration information is to configure the one or more second sub-BWPs of the third BWP; and
perform the service data transmission in a first active BWP, wherein the first active BWP is one of the one or more second sub-BWPs of the third BWP.

13. The communication apparatus according to claim 11, wherein the transceiver is further configured to receive, in the first sub-BWP of the third BWP, first system information corresponding to the first SSB, wherein the first system information comprises a configuration parameter of a beam corresponding to the first SSB.

14. The communication apparatus according to claim 11, wherein the transceiver is further configured to receive a second SSB in the first BWP, wherein a BWP corresponding to the second SSB is the second BWP, and wherein the processor is further configured to initiate random access in the first sub-BWP of the second BWP and on a random access channel occasion corresponding to the second SSB.

15. The communication apparatus according to claim 14, wherein the transceiver is further configured to receive, in the first sub-BWP of the second BWP, second system information corresponding to the second SSB, and the second system information comprises a configuration parameter of a beam corresponding to the second SSB.

16. The communication apparatus according to claim 14, wherein the transceiver is further configured to:
receive second configuration information in the first sub-BWP of the second BWP, wherein the second configuration information is to configure the one or more second sub-BWPs of the second BWP; and
perform the service data transmission in a second active BWP, wherein the second active BWP is one of the one or more second sub-BWPs of the second BWP.

17. The communication apparatus according to claim 14, wherein the transceiver is further configured to receive a first system information block (SIB 1) in the first BWP, wherein the first SIB 1 indicates one or more of: a mapping relationship between the one or more SSBs and the at least one BWP, a first time domain position and/or a first frequency domain position of the first sub-BWP of the second BWP, or a second time domain position and/or a second frequency domain position of the first sub-BWP of the third BWP, or a third time domain position of system information corresponding to each of the one or more SSBs.

18. The communication apparatus according to claim 10, wherein the processor is configured to switch from the second BWP to the third BWP in an $N^{th}$ time unit after a first time unit, and wherein the first time unit is a time unit occupied when the communication apparatus sends the index of the first SSB to the network device.

19. A communication system, comprising:
a communication apparatus comprising:
a transceiver configured to send an index of a first synchronization signal (SS)/physical broadcast channel (PBCH) block (SSB) in a second bandwidth part (BWP), wherein signal quality of the first SSB is greater than or equal to a first threshold, wherein the first SSB is one of one or more SSBs in a first BWP, and wherein the one or more SSBs correspond to at least one BWP other than the first BWP; and
a processor configured to switch from the second BWP to a third BWP, wherein the third BWP is a BWP that is in the at least one BWP and that corresponds to the first SSB; and
a network device configured to receive the index of the first SSB from the communication apparatus.

20. The communication system of claim 19, wherein at least one of the second BWP or the third BWP comprises a first sub-BWP and one or more second sub-BWPs, wherein the first sub-BWP is for transmission of configuration information and/or system information corresponding to an SSB, and wherein the second sub-BWP is for service data transmission.

* * * * *